US012531382B2

(12) United States Patent
Sekine

(10) Patent No.: US 12,531,382 B2
(45) Date of Patent: Jan. 20, 2026

(54) CONNECTOR

(71) Applicant: IRISO ELECTRONICS CO., LTD., Yokohama (JP)

(72) Inventor: Takashi Sekine, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 314 days.

(21) Appl. No.: 18/251,003

(22) PCT Filed: Oct. 28, 2021

(86) PCT No.: PCT/JP2021/039871

§ 371 (c)(1),
(2) Date: Apr. 28, 2023

(87) PCT Pub. No.: WO2022/092224

PCT Pub. Date: May 5, 2022

(65) Prior Publication Data

US 2023/0411896 A1 Dec. 21, 2023

(30) Foreign Application Priority Data

Oct. 29, 2020 (JP) ................................ 2020-181854
Oct. 29, 2020 (JP) ................................ 2020-181855

(51) Int. Cl.
*H01R 24/40* (2011.01)
*H01R 13/24* (2006.01)
(Continued)

(52) U.S. Cl.
CPC ............ *H01R 24/40* (2013.01); *H01R 13/24* (2013.01); *H01R 13/2407* (2013.01);
(Continued)

(58) Field of Classification Search
CPC .... H01R 24/40; H01R 13/24; H01R 13/2407; H01R 13/502; H01R 13/6582; H01R 13/6597; H01R 2103/00; H01R 2201/00
See application file for complete search history.

(56) References Cited

U.S. PATENT DOCUMENTS 5,516,303 A * 5/1996 Yohn ................ H01R 13/6315 439/248
6,447,303 B1 * 9/2002 Kihira ................ H01R 12/716 439/63
(Continued)

FOREIGN PATENT DOCUMENTS

EP 1220358 A2 7/2002
EP 3264535 A1 1/2018
(Continued)

OTHER PUBLICATIONS

International Search Report and Written Opinion for International Application No. PCT/JP2021/039871, dated Dec. 7, 2021, 15 pages.
(Continued)

*Primary Examiner* — Zheng Song
(74) *Attorney, Agent, or Firm* — Westman, Champlin & Koehler, P.A.

(57) ABSTRACT

A connector having excellent high speed transmission performance while also having a positional misplacement accommodation function is provided.
A connector includes a signal terminal including a terminal contact portion capable of making electrically contiguous contact with a first contact portion of a connection target for connection from a Z direction one side, a housing that retains the signal terminal, and a shell that surrounds at least part of the signal terminal. The shell includes a shield contact portion that makes electrically contiguous contact
(Continued)

with a second contact portion of the connection target. The shell is able to displace in the Z direction.

17 Claims, 36 Drawing Sheets

(51) Int. Cl.

| | |
|---|---|
| ***H01R 13/502*** | (2006.01) |
| ***H01R 13/6582*** | (2011.01) |
| ***H01R 13/6597*** | (2011.01) |
| *H01R 103/00* | (2006.01) |

(52) U.S. Cl.

CPC ....... *H01R 13/502* (2013.01); *H01R 13/6582* (2013.01); *H01R 13/6597* (2013.01); *H01R 2103/00* (2013.01); *H01R 2201/00* (2013.01)

(56) References Cited

U.S. PATENT DOCUMENTS

| | | | | |
|---|---|---|---|---|
| 6,520,785 | B2 * | 2/2003 | Hida | H01R 24/46 200/51.09 |
| 9,065,186 | B2 | 6/2015 | Perrin | |
| 9,461,391 | B2 | 10/2016 | Kato | |
| 10,193,252 | B2 | 1/2019 | Sakamoto | |
| 2002/0081910 | A1 | 6/2002 | Kihira et al. | |
| 2014/0235100 | A1 | 8/2014 | Perrin | |
| 2015/0311619 | A1 | 10/2015 | Kato | |
| 2018/0183162 | A1 | 6/2018 | Sakamoto | |
| 2020/0169040 | A1 * | 5/2020 | Sakaue | H01R 13/26 |
| 2021/0313746 | A1 * | 10/2021 | Kato | H01R 13/6215 |
| 2023/0369813 | A1 | 11/2023 | Sekine | |

FOREIGN PATENT DOCUMENTS

| | | | | |
|---|---|---|---|---|
| EP | 3657608 | A1 | 5/2020 | |
| FR | 3002371 | A1 | 8/2014 | |
| JP | 2002-198107 | A | 7/2002 | |
| JP | 2009-099411 | A | 5/2009 | |
| JP | 2016-001594 | A | 1/2016 | |
| JP | 2016024863 | A | 2/2016 | |
| JP | 2016-162556 | A | 9/2016 | |
| JP | 2017142980 | A | 8/2017 | |
| JP | 2018-107097 | A | 7/2018 | |
| WO | 2014084293 | A1 | 6/2014 | |
| WO | WO-2016136268 | A1 * | 9/2016 | H01R 12/91 |

OTHER PUBLICATIONS

International Search Report and Written Opinion for International Application No. PCT/JP2021/039870, dated Dec. 7, 2021, 15 pages.

Extended European Search Report for corresponding International Application No. PCT/JP2021/039871, filed Oct. 28, 2021, dated Aug. 7, 2024.

Office Action for U.S. Appl. No. 18/251,002, dated May 9, 2025, 23 pages.

Japanese Office Action for Japanese Patent Application No. 2022559238, dated Oct. 21, 2025, 11 pages.

* cited by examiner

CONNECTOR

CROSS REFERENCE TO RELATED APPLICATION(S)

This application is a Section 371 National Stage Application of International Application No. PCT/JP2021/039871, filed on Oct. 28, 2021, entitled "CONNECTOR", which published as WIPO Publication No. 2022/092224, on May 5, 2022, not in English, which claims priority to Japanese Patent Application No. 2020-181854, filed on Oct. 29, 2020, and Japanese Patent Application No. 2020-181855, filed on Oct. 29, 2020, the disclosures of which are incorporated herein by reference in their entireties.

TECHNICAL FIELD

The present disclosure relates to a connection structure and a connector.

BACKGROUND ART

A connection structure and connector disclosed in Patent Document 1 are known. In this connection structure, a first connection terminal of a first case member and a second connection terminal of a connector mounted on a circuit board make electrically contiguous contact with each other. In this connection structure a state of electrically contiguous contact can be obtained even when the relative position between the circuit board and the first case member is misplaced somewhat from the correct position.

RELATED ART

Patent Documents

Patent Document 1: Japanese Patent Application Laid-Open (JP-A) No. 2009-99411

SUMMARY OF INVENTION

Technical Problem

Recently, along with increasing high performance of electrical components, an improvement in high speed transmission performance is being demanded in such connection structures and connectors.

An object of the present disclosure is to provide a connection structure and connector that have excellent high speed transmission performance while also having a positional misplacement accommodation function.

Solution to Problem

In the present disclosure, an X direction, a Y direction, and a Z direction will be employed as mutually perpendicular direction concepts when describing a structure and shape of an object, with these being direction concepts with respect to the object.

Connection Structure

A connection structure according to a first aspect is a connection structure including a connection target, and a connector that, from out of a Z direction one side and a Z direction other side, contacts the connection target from the Z direction other side. The connection target includes an inner conductor portion, and an outer conductor portion that surrounds the inner conductor portion. The connector includes a signal terminal including a first connector contact portion, a shield member including a second connector contact portion, and a housing. The inner conductor portion includes an inner conductor contact portion capable of abutting against the first connector contact portion in the Z direction. The outer conductor portion includes an outer conductor contact portion capable of abutting against the second connector contact portion in the Z direction.

In the above aspect the connection structure is a connection structure including the connection target and the connector. The connector includes the signal terminal including the first connector contact portion, the shield member including the second connector contact portion, and the housing, and contacts the connection target from the Z direction other side from out of the Z direction one side and the Z direction other side. The connection target includes the inner conductor portion and the outer conductor portion. The inner conductor contact portion of the inner conductor portion contacts the first connector contact portion of the connector, and the outer conductor contact portion of the outer conductor portion contacts the second connector contact portion of the connector.

The outer conductor portion surrounds the inner conductor portion. The outer conductor portion accordingly shields the inner conductor portion, and so the high speed transmission performance is raised.

Moreover, the inner conductor contact portion is capable of abutting against the first connector contact portion in the Z direction, and the outer conductor contact portion is capable of abutting against the second connector contact portion in the Z direction. The contact between the first connector contact portion and the inner conductor contact portion, and the contact between the second connector contact portion and the outer conductor contact portion, are accordingly both abutting contact in the Z direction. This accordingly enables relative positional misplacement between the connection target and the connector to be accommodated in directions orthogonal to the Z direction, which is the abutting direction.

A connection structure according to a second aspect is the first aspect, wherein the inner conductor contact portion and the outer conductor contact portion are both flat surfaces having normal directions toward the Z direction other side, and having Z direction positions aligned with each other.

In the above aspect, the inner conductor contact portion and the outer conductor contact portion are both flat surfaces having normal directions toward the Z direction other side, and having Z direction positions aligned with each other. This thereby enables smoother accommodation of relative positional misplacement between the connection target and the connector in directions orthogonal to the Z direction, which is the abutting direction.

A connection structure according to a third aspect is the first or the second aspect, wherein the inner conductor portion and the outer conductor portion form a coaxial connector section.

In the above aspect, the coaxial connector section formed by the inner conductor portion and the outer conductor portion makes abutting contact with the first connector contact portion and the second connector contact portion of the connector.

A connection structure according to a fourth aspect is any one of the first to the third aspects, wherein the second connector contact portion and the outer conductor portion are in contact with each other further to the Z direction one side than the housing.

A recess is formed in the housing of JP-A No. 2016-162556. The second connector contact portion and the outer conductor portion make contact in the recess of the housing. Namely, the second connector contact portion and the outer conductor portion make contact at the inside of the housing in the Z direction. This means that there is need to form the housing bulky enough in a direction orthogonal to the Z direction to enable a recess to be formed that the outer conductor portion of the connection target is able to enter into.

In contrast thereto, the above aspect may be configured without forming a recess in the housing that the outer conductor portion of the connection target is able to enter into, enabling the housing to be more compact in the direction orthogonal to the Z direction, and thereby enabling the connection structure to be more compact.

Note that the above aspect may, furthermore, be configured such that "the first connector contact portion and the inner conductor portion make contact further to the Z direction one side than the housing".

A connection structure according to a fifth aspect is the fourth aspect, wherein the shield member includes a top face portion that opposes the outer conductor contact portion in the Z direction and is positioned at the Z direction one side of the housing, and the top face portion includes the second connector contact portion.

In the above aspect, due to the shield member including the top face portion that is positioned at the Z direction one side of the housing and the top face portion including the second connector contact portion, the second connector contact portion is realized that contacts the outer conductor portion further to the Z direction one side than the housing.

A connection structure according to a sixth aspect is the fourth aspect, wherein the shield member includes a shell, the shell includes a top face portion that opposes the outer conductor contact portion in the Z direction and is positioned at the Z direction one side of the housing, and a side face portion that surrounds the signal terminal from a direction orthogonal to the Z direction, and the top face portion includes the second connector contact portion.

In the above aspect, due to the shield member including the shell, and the side face portion of the shell surrounding the signal terminal from a direction orthogonal to the Z direction, noise countermeasures are exhibited at the connector side of the connection structure. Moreover, due to the top face portion of the shell including the second connector contact portion positioned at the Z direction one side of the housing, the second connector contact portion is realized that contacts the outer conductor portion further to the Z direction one side than the housing.

A connection structure according to a seventh aspect is any one of the first to fourth aspects, wherein the shield member includes a shell including the second connector contact portion, and the shell includes a top face portion having a plate thickness direction in the Z direction and a side face portion extending from an outer edge of the top face portion toward the Z direction other side. The shell is disposed with respect to the housing such that the housing is covered from the Z direction one side, an opening is formed in the top face portion so as to expose the first connector contact portion, and an area on an upper face of the top face portion encircling the opening serves as the second connector contact portion contacting the outer conductor contact portion.

However, the second connector contact portion of the connector needs to be able to contact the outer conductor contact portion, and so sometimes the connector becomes bulky in the X direction and the Y direction in order to realize this need. For example, in the connection structure described in JP-A No. 2016-162556, the recess is formed in the housing of the connector, and the second connector contact portion (leading end portion of the receptacle ground pin) is disposed in this recess. This means that there is a need to form a recess in the housing such that the outer conductor portion of the connection target enters therein, the housing becomes bulky in the X direction, a Y direction, and as a result thereof the connector becomes bulky.

Thus in the above aspect, the connector includes the shell including the top face portion and the side face portion, and the shell is disposed so with respect to the housing such that the housing is covered from the Z direction one side. The face on the Z direction one side of the top face portion of the shell functions as the second connector contact portion. There is accordingly no longer a need to form a recess in the housing for the outer conductor portion of the connection target to enter into, and moreover a wide area on the Z direction one side of the connector can be caused to function as the second connector contact portion. As a result thereof, the connector can be made more compact in the X direction and the Y direction.

A connection structure according to an eighth aspect is any one of the first to seventh aspects, wherein the housing includes a pair of terminal close-proximity walls opposing each other in a Y direction, the signal terminal is disposed between the pair of terminal close-proximity walls, and the shield member includes a pair of assist plates, with the pair of assist plates having a plate thickness direction facing in the Y direction and being disposed at a Y direction outside with respect to the pair of terminal close-proximity walls.

In the above aspect the housing includes the pair of terminal close-proximity walls that oppose each other in the Y direction, and the shield member includes the pair of assist plates. The signal terminal is disposed between the pair of terminal close-proximity walls. The pair of assist plates have plate thickness directions facing in the Y direction and are disposed at the Y direction outside with respect to the pair of terminal close-proximity walls. This part of the housing is accordingly disposed so as to be adjacent to the signal terminal in the Y direction with the assist plates are disposed at the outside thereof, thereby enabling the impedance of the signal terminal to be adjusted and a connector compatible with high speed transmission to be realized.

A connection structure according to a ninth aspect is an eighth aspect, wherein the signal terminal includes a retained portion that is retained between the pair of terminal close-proximity walls, a portion of the pair of terminal close-proximity walls where the retained portion is retained has a face on the Y direction outside enlarged toward the Y direction outside compared to other portions, and the pair of assist plates are shaped running along the Y direction outside faces of the pair of terminal close-proximity walls.

In the above aspect the retained portion of the signal terminal is retained between the pair of terminal close-proximity walls.

The portion of the pair of terminal close-proximity walls where the retained portion is retained has a face on the Y direction outside enlarged toward the Y direction outside compared to other portions. The pair of assist plates are shaped running along the Y direction outside faces of the pair of terminal close-proximity walls. This means that the Y direction distance between the signal terminal and the retaining plate is close to being fixed without varying depending on position in the X direction, the impedance is adjusted, and transmission performance is raised.

A connection structure according to a tenth aspect is any one of the first to fifth aspects, wherein the shield member includes a shell including the second connector contact portion, and a ground terminal including a shell contact portion that makes electrically conductive contact with the shell, the signal terminal includes a leading-end-side extension portion that extends in a specific direction as viewed from the Z direction and that includes the first connector contact portion at an extension direction leading end side, the ground terminal includes a pair of leading-end-side extension portions that extend in the specific direction as viewed from the Z direction and that include the shell contact portion at an extension direction leading end side, and the pair of leading-end-side extension portions of the ground terminal are disposed at both Y direction sides with respect to the leading-end-side extension portion of the signal terminal.

In the above aspect the signal terminal includes the leading-end-side extension portion including the first connector contact portion at the extension direction leading end side, and the ground terminal includes the pair of leading-end-side extension portions including the shell contact portion that contacts the shell at the extension direction leading end side.

The leading-end-side extension portion of the signal terminal and the pair of leading-end-side extension portions of the ground terminal both extend in the same specific direction as viewed from the Z direction. Furthermore, the pair of leading-end-side extension portions of the ground terminal are disposed at both Y direction sides with respect to the leading-end-side extension portion of the signal terminal. The leading-end-side extension portion of one of the ground terminal, the leading-end-side extension portion of the signal terminal, and the leading-end-side extension portion of the other ground terminal accordingly function as a ground-shield-ground structure (GSG structure), and the transmission characteristics are improved.

A connection structure according to an eleventh aspect is any one of the first to tenth aspects, wherein the connection target is a rear member that configures part of an outer sheath of a camera module, and the rear member includes a connector section that includes the inner conductor portion and the outer conductor portion, with the connector section electrically connecting an interior and an exterior of the camera module together.

In the above aspect the connection structure is a connection structure between the rear member of the camera module and the connector.

Connector

A connector according to a first aspect is a connector including a signal terminal including a terminal contact portion configured so as to be capable of making electrically contiguous contact with a first contact portion of a connection target for connection from a Z direction one side, a housing that retains the signal terminal, and a shell that surrounds at least part of the signal terminal. The shell includes a shield contact portion that is capable of making electrically contiguous contact with a second contact portion of the connection target, and the shell is able to displace in the Z direction.

In the above aspect the connector includes the signal terminal, the housing that retains the signal terminal, and the shell that surrounds at least part of the signal terminal. The signal terminal includes the terminal contact portion configured so as to be capable of making electrically contiguous contact with the first contact portion of the connection target for connection from the Z direction one side, and the shell includes the shield contact portion capable of making electrically contiguous contact with the second contact portion of the connection target.

The shell including the shield contact portion is capable of displacing in the Z direction.

This means that positional misplacement in the Z direction between the connector and the connection target (such as misplacement due to assembly tolerance) can be absorbed.

A connector according to a second aspect is the first aspect, wherein the shell includes a top face portion positioned at the Z direction one side of the housing, and an opening is formed in a center of the top face portion so as to expose the terminal contact portion.

In the above aspect, the shell includes the top face portion positioned at the Z direction one side of the housing. The opening is formed in the center of the top face portion so as to expose the terminal contact portion.

This thereby enables the area on the upper face of the top face portion encircling the opening to be caused to function as the shield contact portion.

A connector according to the third aspect is the first or second aspect, wherein the shell includes a side face portion that surrounds the signal terminal from a direction orthogonal to the Z direction.

In the above aspect the shell includes the side face portion. The side face portion surrounds the signal terminal from the direction orthogonal to the Z direction. Noise countermeasures are thereby improved.

A connector according to the fourth aspect is the third aspect, wherein the side face portion is shaped to surround the signal terminal from the direction orthogonal to the Z direction by performing bend processing on a plate material, and a portion is formed where the plate material overlaps with itself such that a gap does not arise in a shape surrounding the signal terminal from the direction orthogonal to the Z direction.

In the above aspect the side face portion is shaped to surround the signal terminal from the direction orthogonal to the Z direction by performing bend processing on the plate material.

When doing so the portion is formed where the plate material overlaps with itself such that a gap does not arise in the shape surrounding the signal terminal from the direction orthogonal to the Z direction. The noise countermeasures for the signal terminal are thereby improved.

A connector according to a fifth aspect is the first aspect, wherein the shell includes a top face portion disposed at the Z direction one side of the housing, and a side face portion that surrounds the signal terminal from a direction orthogonal to the Z direction further to the Z direction other side than the top face portion, an opening is formed in a center of the top face portion so as to expose the terminal contact portion, the side face portion is configured from plural plate portions each connected to the top face portion through a bent portion, and parts of adjacent plate portions from out of the plural plate portions are overlapped with each other.

In the above aspect the side face portion of the shell is configured from the plural plate portions each connected to the top face portion through a bent portion.

The parts of the adjacent plate portions from out of the plural plate portions are overlapped with each other. A gap is thereby suppressed from being formed between the adjacent plate portions from out of the plural plate portions.

A connector according to a sixth aspect is any one of the first to the fifth aspects, wherein the connector includes a resilient support portions for resiliently supporting the shell so as to be capable of displacing in the Z direction.

In the above aspect the connector includes the resilient support portions for resiliently supporting the shell so as to be capable of displacing in the Z direction. This thereby enables the shield contact portion to be placed in pressed contact against the connection target by displacing the shell toward the Z direction other side to achieve a connected state.

A connector according to a seventh aspect is any one of the first to the sixth aspects, wherein the housing includes a pair of terminal close-proximity walls opposing each other in the Y direction, the signal terminal is disposed between the pair of terminal close-proximity walls, and the connector includes a pair of assist plates having plate thickness directions facing in the Y direction, and disposed at a Y direction outside with respect to the pair of terminal close-proximity walls.

In the above aspect, the housing includes the pair of terminal close-proximity walls opposing each other in the Y direction and the signal terminal is disposed between the pair of terminal close-proximity walls.

The connector includes the pair of assist plates. The pair of assist plates have plate thickness directions facing in the Y direction and are disposed at the Y direction outside with respect to the pair of terminal close-proximity walls. This means that part of the housing is disposed so as to be adjacent to the signal terminal in the Y direction, with the assist plates disposed at the outside thereof, enabling the impedance of the signal terminal to be adjusted and a connector compatible with high speed transmission to be realized.

The connector according to an eighth aspect is the seventh aspect, wherein the signal terminal includes a retained portion retained between the pair of terminal close-proximity walls, a portion of the pair of terminal close-proximity walls where the retained portion is retained includes a face on a Y direction outside enlarged toward the Y direction outside more than other portions, and the pair of assist plates are shaped to run along Y direction outside faces of the pair of terminal close-proximity walls.

In the above aspect, the retained portion of the signal terminal is retained between the pair of terminal close-proximity walls.

The portion of the pair of terminal close-proximity walls where the retained portion is press-fitted into includes the face on the Y direction outside enlarged toward the Y direction outside more than other portions. The pair of assist plates are shaped running along the Y direction outside faces of the pair of terminal close-proximity walls. This means that a Y direction distance between the signal terminal and the retaining plate is close to being fixed without varying depending on position in the X direction, the impedance is adjusted, and transmission performance is raised.

A connector according to a ninth aspect is any one of the first to eighth aspects, wherein the connector includes a ground terminal to make electrically contiguous connection between an attachment target to which the connector is attached and the shell.

In the above aspect the connector includes the ground terminal to make electrically contiguous connection between the attachment target to which the connector is attached and the shell. This thereby enables stable high speed transmission performance to be secured better than embodiments in which the shell is not electrically contiguously connected to the attachment target.

A connector according to a tenth aspect is a ninth aspect, wherein the shell and the ground terminal are separate bodies, the ground terminal includes a resilient support portion to resiliently support the shell so as to be able to displace in the Z direction, and the resilient support portion includes a shell contact portion that electrically contiguously connects the ground terminal and the shell together by making electrically contiguous contact with the shell.

In the above aspect the shell and the ground terminal are separate bodies. The ground terminal includes the resilient support portion to resiliently support the shell so as to be able to displace in the Z direction, and the resilient support portion includes the shell contact portion that electrically contiguously connects the ground terminal and the shell together by making electrically contiguous contact with the shell. This thereby enables resilient support of the shell, and electrically contiguous connection between the shell and the ground terminal, to both be performed by the resilient support portion.

A connector according to an eleventh aspect is any one of the first to ninth aspects, wherein the shell is formed as a single body with the resilient support portion to resiliently support the shell so as to be capable of displacing in the Z direction by contacting the housing.

In the above aspect the shell is resiliently supported so as to be capable of displacing in the Z direction by configuring the resilient support portion formed as a single body with the shell so as to contact the housing.

A connector according to the twelfth aspect is the ninth aspect, wherein the shell and the ground terminal are separate bodies, the shell is formed as a single body with the resilient support portion to resiliently support the shell so as to be capable of displacing in the Z direction by contacting the housing, and the ground terminal includes a shell contact portion that makes electrically contiguous contact with the shell.

In the above aspect, the shell is resiliently supported so as to be capable of displacing in the Z direction by configuring the resilient support portions formed as a single body with the shell so as to contact the housing. Moreover, electrically contiguous connection between the ground terminal and the shell is realized by the shell contact portion of the ground terminal making electrically contiguous contact with the shell.

A connector according to a thirteenth aspect is the tenth aspect, wherein the signal terminal includes a leading-end-side extension portion that extends in a specific direction as viewed from the Z direction and that includes the terminal contact portion at an extension direction leading end side, the ground terminal includes a pair of leading-end-side extension portions that extend in the specific direction as viewed from the Z direction and that include the shell contact portion at an extension direction leading end side, and the pair of leading-end-side extension portions of the ground terminal are disposed at both Y direction sides with respect to the leading-end-side extension portion of the signal terminal.

In the above aspect, the signal terminal includes the leading-end-side extension portion including the terminal contact portion at the extension direction leading end side, and the ground terminal includes the pair of leading-end-side extension portions that, at the extension direction leading end side, include the shell contact portion for contacting the shell.

The leading-end-side extension portion of the signal terminal and the pair of leading-end-side extension portions of the ground terminal extend in the same specific direction as viewed from the Z direction. Furthermore, the pair of leading-end-side extension portions of the ground terminal are disposed at both Y direction sides with respect to the leading-end-side extension portion of the signal terminal. This means that one of the leading-end-side extension portions of the ground terminal, the leading-end-side extension portion of the signal terminal, and the other leading-end-side extension portion of the ground terminal accordingly function as a ground-shield-ground structure (GSG structure), and the transmission characteristics are improved.

A connector according to a fourteenth aspect is any one of the first to the thirteenth aspects, wherein a direction in which the shield contact portion contacts the second contact portion of the connection target, and a direction in which the terminal contact portion contacts the first contact portion of the connection target, are both the Z direction.

In the above aspect, the direction in which the shield contact portion contacts the second contact portion of the connection target, and the direction in which the terminal contact portion contacts the first contact portion of the connection target, are both the Z direction. This enables the shape of the signal terminal to be more simple than in, for example, embodiments in which the contact direction of the terminal contact portion is a direction perpendicular to the Z direction.

A connector according to a fifteenth aspect is any one of the first to fourteenth aspects, wherein in an initial state the shield contact portion is positioned further to a Z direction one side than the terminal contact portion.

In the above aspect the shield contact portion is positioned further to the Z direction one side than the terminal contact portion in the initial state. This facilitates first contact of the shield contact portion when being contacted to the connection target.

The connector according to a sixteenth aspect is any one of the first to fifteenth aspects, further including a pair of movable assist plates having plate thickness directions facing in the Y direction and displacing in the Z direction coupled to displacement of the shell in the Z direction, wherein a portion of the signal terminal that projects out from the housing toward the Z direction one side is positioned between the pair of movable assist plates.

In the above aspect the connector includes the pair of movable assist plates having plate thickness directions facing in the Y direction and displacing in the Z direction coupled to displacement of the shell in the Z direction. The portion of the signal terminal that projects out from the housing toward the Z direction one side is positioned between the pair of movable assist plates. This means that impedance is adjusted for the portion of the signal terminal that projects out from the housing toward the Z direction one side, raising the high speed transmission performance.

A connector according to a seventeenth aspect is the seventh aspect or the eighth aspect, further including a pair of movable assist plates having plate thickness directions facing in the Y direction and displacing in the Z direction coupled to displacement of the shell in the Z direction, wherein a portion of the signal terminal that projects out from the housing toward the Z direction one side is positioned between the pair of movable assist plates.

In the above aspect the impedance of the signal terminal is adjusted by the pair of assist plates and the pair of movable assist plates, and the high speed transmission performance is raised more.

Note that the above aspect may furthermore be configured such that “the movable assist plate and the assist plate make electrically contiguous contact”.

DESCRIPTION OF EMBODIMENTS

For ease of explanation, in the following description ±X directions will be taken as being front-rear directions, ±Y directions as width directions, and ±Z direction as up-down directions.

Figure 12:
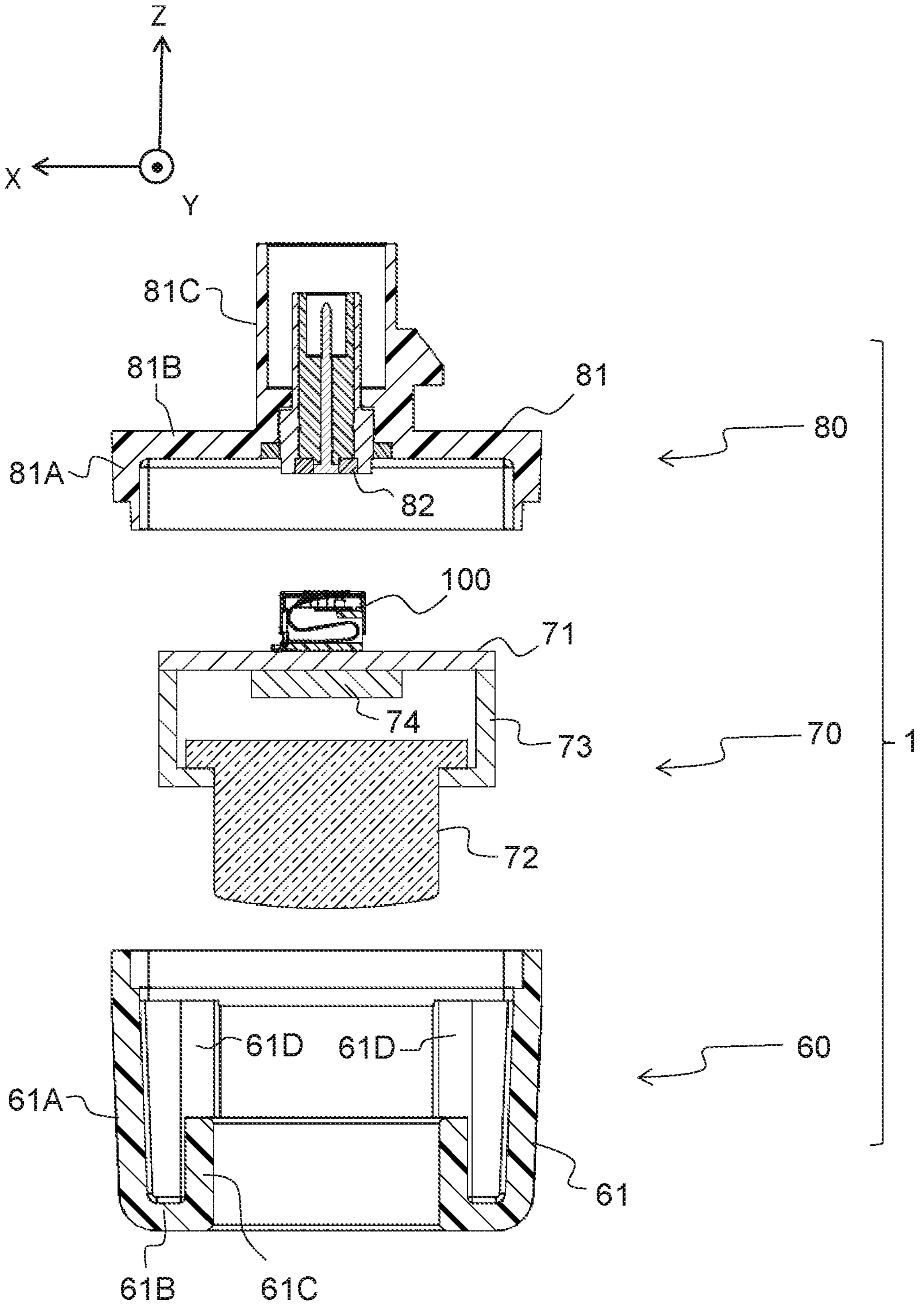
FIG. 12 is an exploded cross-section of a camera module.

FIG. 12 is an exploded cross-section of a camera module 1 according to the present exemplary embodiment.

A connector 100 is a connector for connecting a board 71 serving as an "attachment target" and a rear member 80 serving as a "connection target" together electrically.

First, description follows regarding the connector 100 according to a first exemplary embodiment, then description will be made of the camera module 1 provided with the connector 100. Other exemplary embodiments will then be described.

First Exemplary Embodiment: Connector 100

Figure 1:
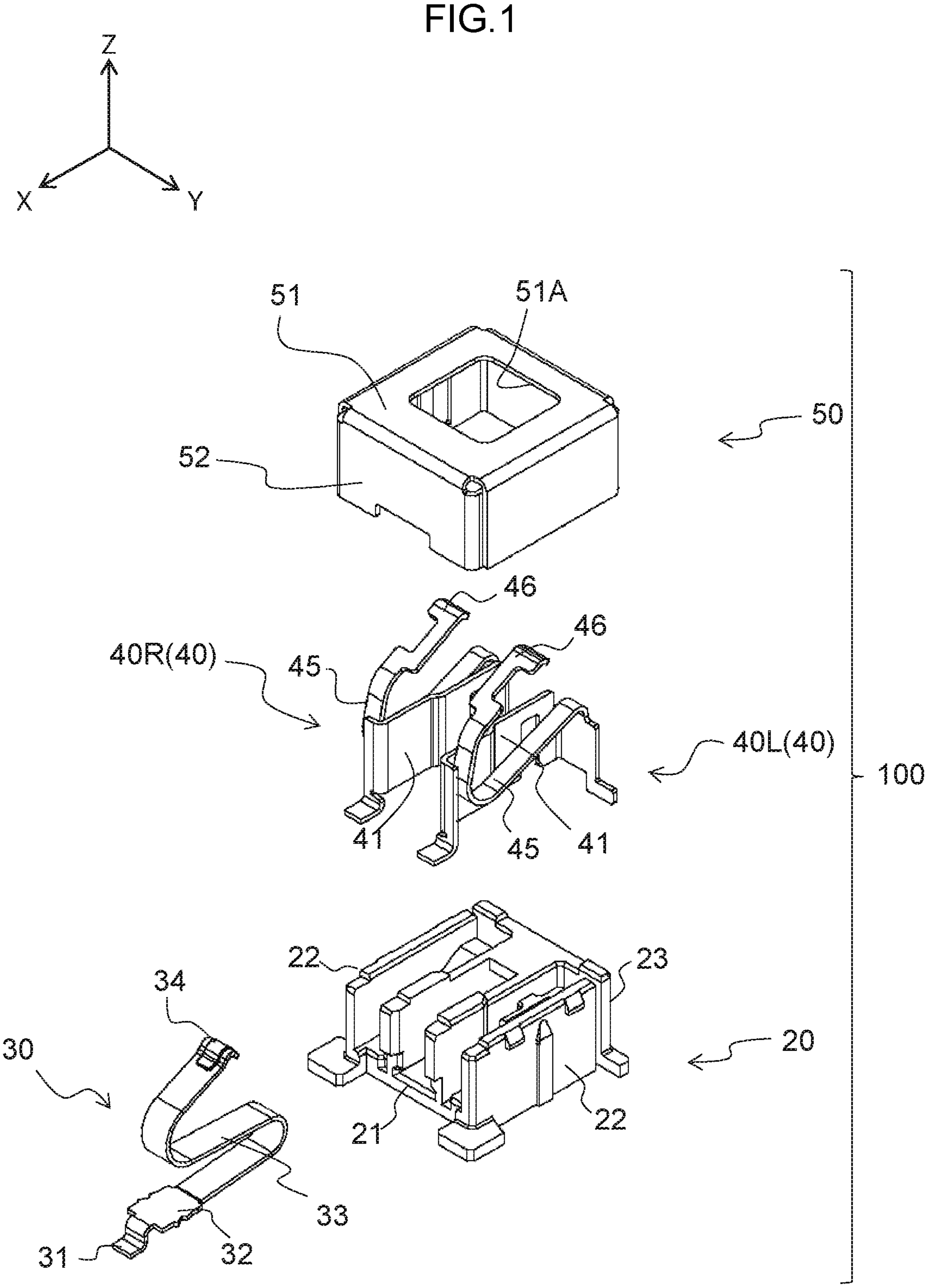
FIG. 1 is a exploded perspective view of a connector according to a first exemplary embodiment.

FIG. 1 is an exploded perspective view of the connector 100.

The connector 100 includes a housing 20, a signal terminal 30, two ground terminals 40R, and a shell 50.

Figure 2:
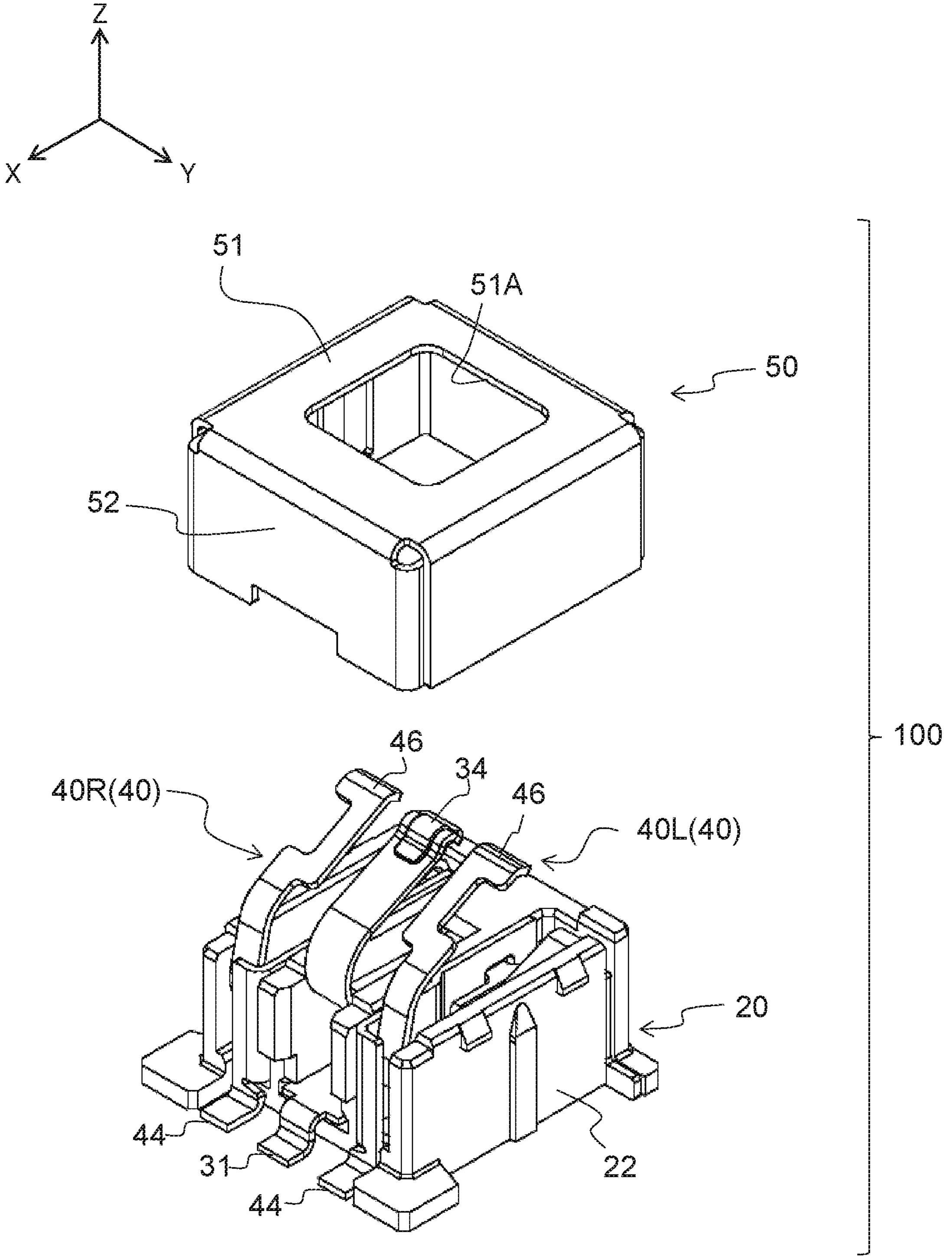
FIG. 2 is a perspective view of partway through assembling a connector according to the first exemplary embodiment.
Figure 3:
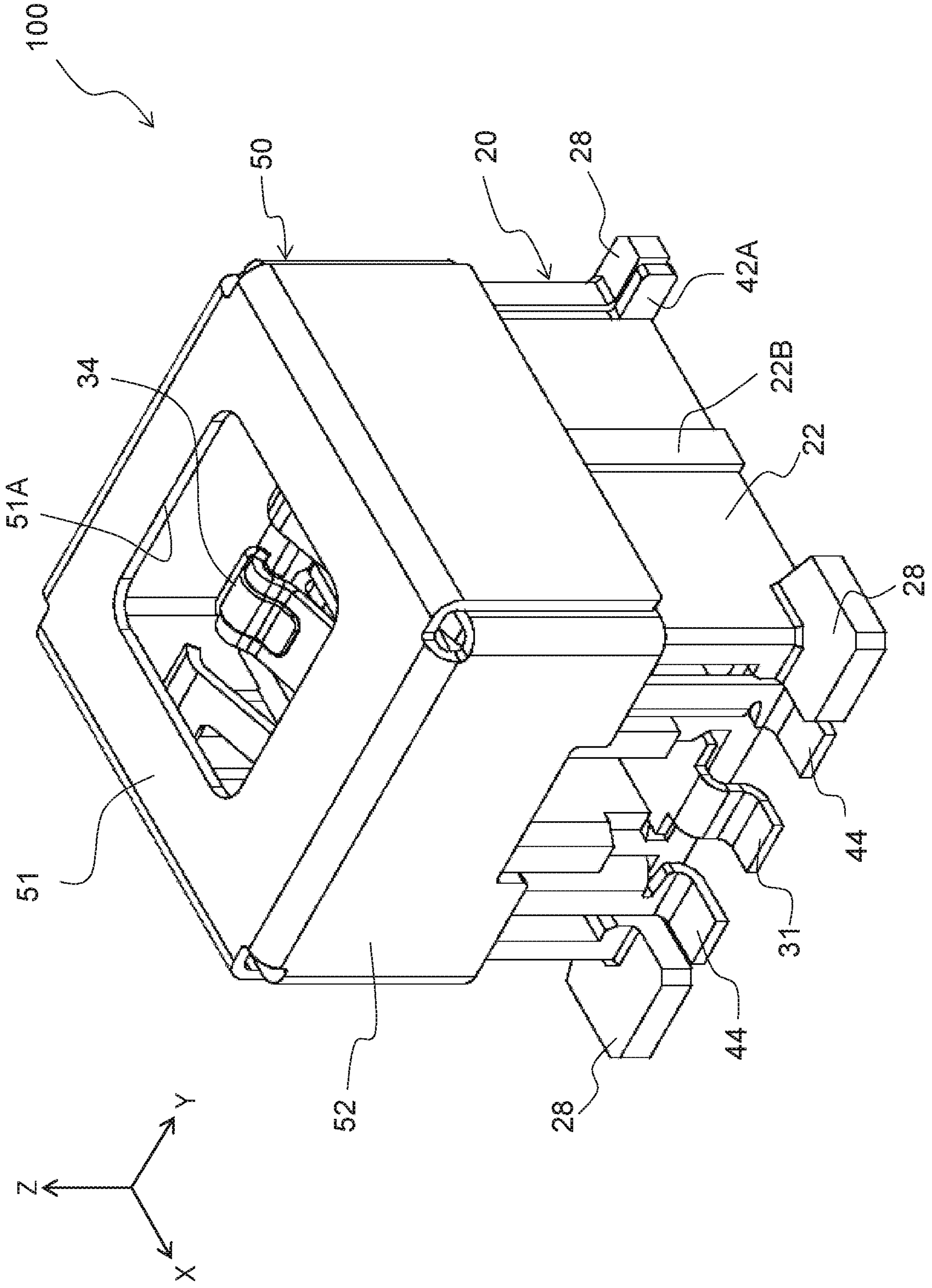
FIG. 3 is a perspective view of a connector (in an initial state) according to the first exemplary embodiment.

The connector 100 is assembled by the following procedure (FIG. 1 to FIG. 3).

First the signal terminal 30 and the ground terminals 40 are attached to the housing More specifically, the signal terminal 30 is press-fitted into the housing 20 from the plus X direction, and the pair of ground terminals 40 are press-fitted into the housing 20 from the plus Z direction.

The shell 50 is then attached from the plus Z direction to the housing 20 that the signal terminal 30 and ground terminal 40 have already been attached to.

Next, detailed description follows regarding each configuration component.

Housing 20

Figure 8:
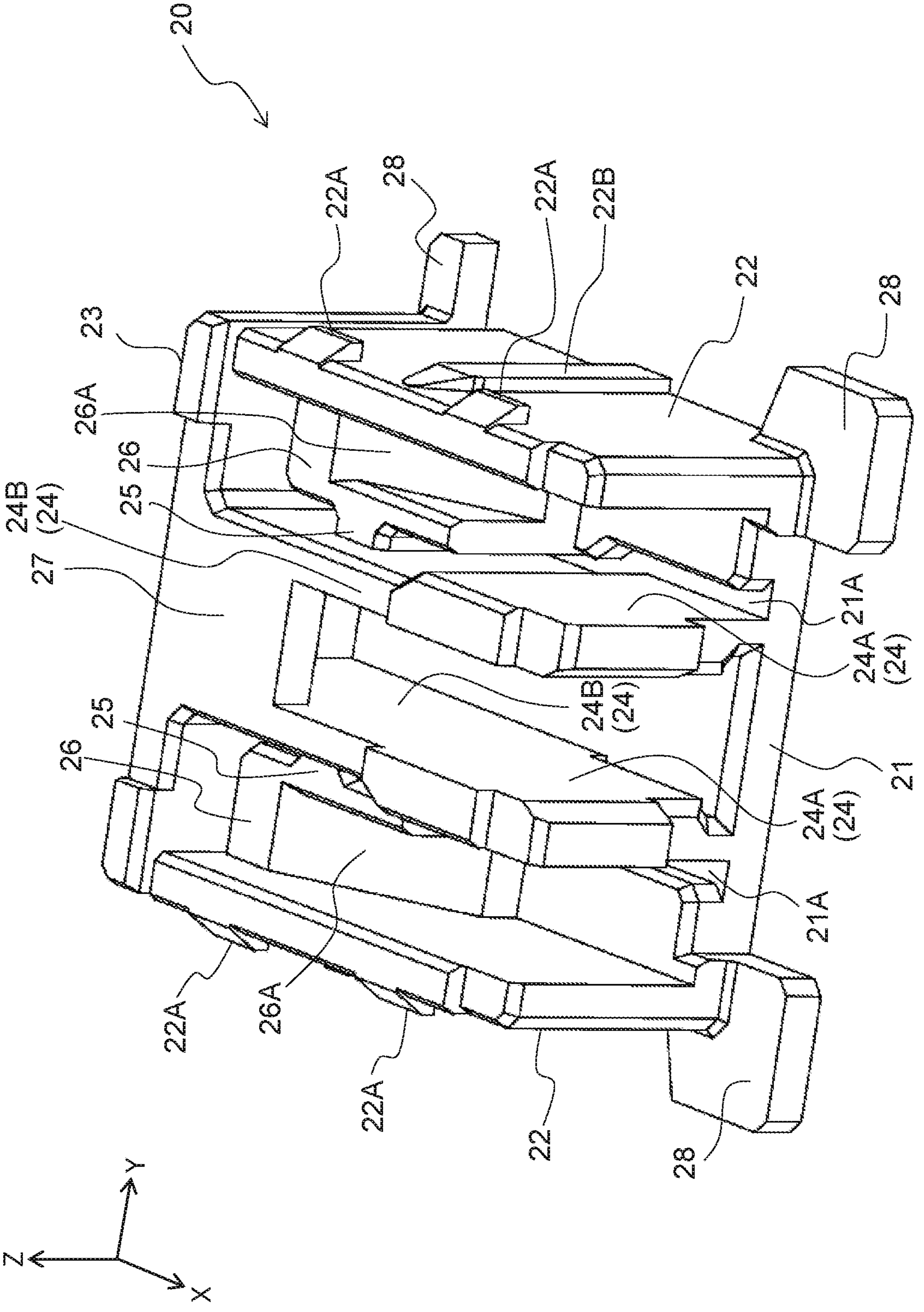
FIG. 8 is a perspective view of a housing.

FIG. 8 is a perspective view of the housing 20.

The material configuring the housing 20 is an insulator such as a synthetic resin.

The housing 20 includes a bottom wall 21, a pair of side walls 22, and a rear wall 23.

The housing 20 also includes a pair of terminal close-proximity walls 24. The pair of terminal close-proximity walls 24 are in close-proximity at the left and right of the signal terminal 30. A rear portion and upper portion of the pair of terminal close-proximity walls 24 are connected together in the width direction by a connection wall 27.

The pair of terminal close-proximity walls 24 have a wall thickness direction facing in the width direction, and are formed at a width direction inside of the pair of side walls 22. The signal terminal 30 is disposed between the pair of terminal close-proximity walls 24. A retained portion 32 of the signal terminal 30 is press-fitted into a lower end of a front portion 24A of the pair of terminal close-proximity walls 24.

Figure 7:
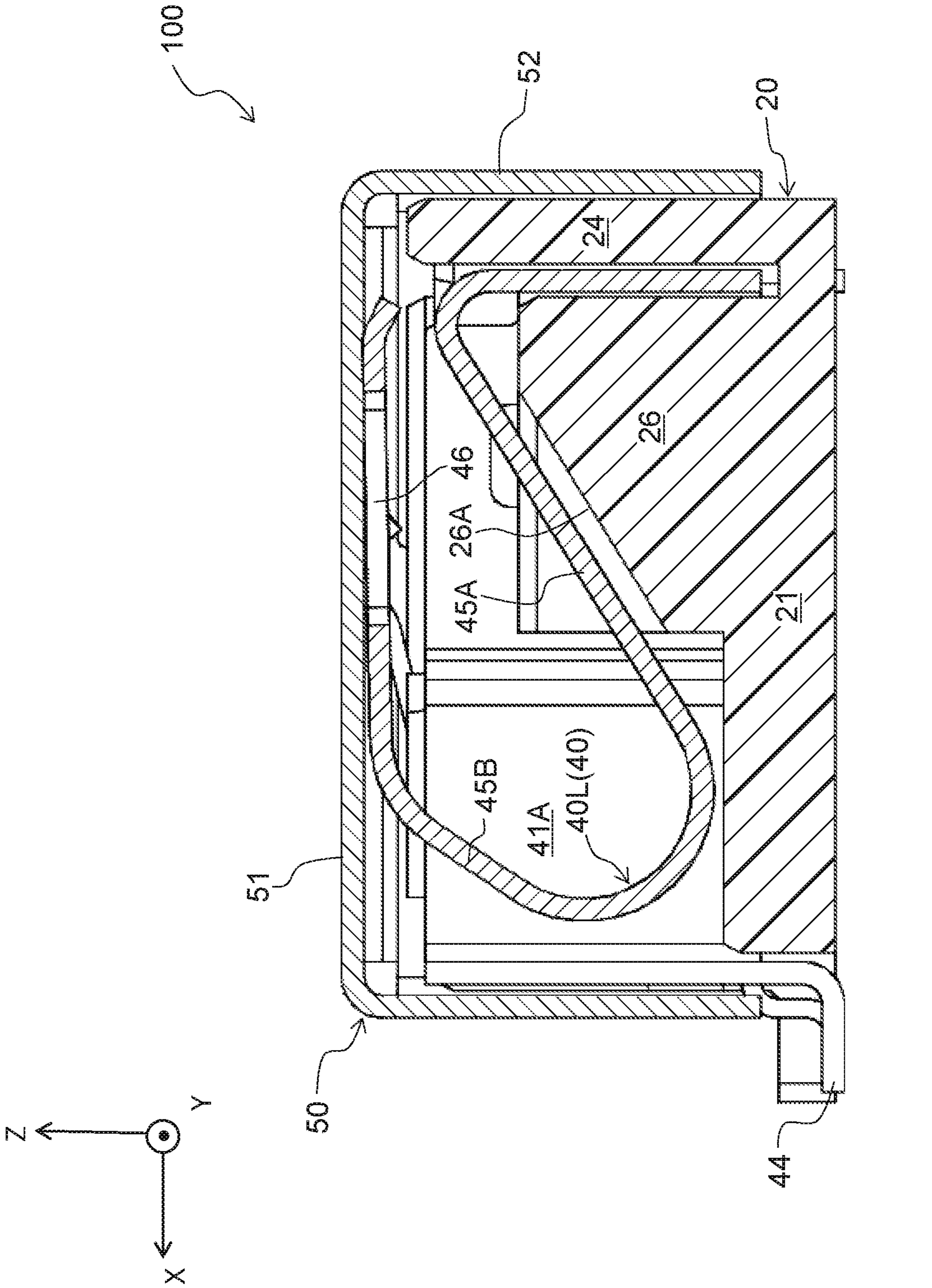
FIG. 7 is a cross-section corresponding to FIG. 4.

The housing 20 includes bulge portions 26 that bulge out from the bottom wall 21 toward the upper side. The bulge portions 26 are formed at a rear portion between the side walls 22 and the terminal close-proximity walls 24. The bulge portions 26 each include an inclined face 26A. The inclined face 26A is inclined so as to be substantially parallel to a first extension portion 45A of a resilient portion 45 when the ground terminals 40 have been deformed greatly (see FIG. 7). The strength of the housing 20 is raised by the bulge portions 26 while also not impeding deformation of the ground terminals 40.

The housing 20 includes ground terminal retaining portions 25 that retain the ground terminals 40. The ground terminal retaining portions 25 are formed as a pair at the outside of the pair of terminal close-proximity walls 24. The ground terminal retaining portions 25 are formed as walls connecting the bulge portion 26 and a rear portion 24B of the terminal close-proximity walls 24 together in the width direction.

The housing 20 includes upper restriction sections 22A that restrict movement of the shell 50 in the plus Z direction. The upper restriction sections 22A are projections formed at a width direction outside of the pair of side walls 22. The upper restriction sections 22A are positioned at an upper end of the side walls 22. The upper restriction sections 22A are formed at a total of four locations, two locations for each of the side walls 22.

The housing 20 includes guide portions 22B to guide movement of the shell 50 in the up-down direction. The guide portions 22B each bulge toward the width direction outside from the pair of respective side walls 22. The guide portions 22B extend in the up-down direction. In the vicinity of an upper end of the guide portions 22B, a width dimension decreases gradually on progression upward and an amount of bulge toward the width direction outside decreases gradually on progression upward. A lower end of the guide portions 22B is aligned in the up-down direction with a lower end of the side walls 22.

The housing 20 includes tail protection portions 28. There are four of the tail protection portions 28 formed corresponding to corner portions of the housing 20 that has a substantially square shape in plan view. The tail protection portions 28 protect tails (connection portions 31, connection portions 42A, 44) of the signal terminal 30 and the ground terminals 40 (see FIG. 3).

Groove portions 21A indented toward the lower side are formed in the bottom wall 21 of the housing 20 so as to correspond to positions where first vertical plate portions 41 of the ground terminals 40 are disposed.

Signal Terminal 30

Figure 9:
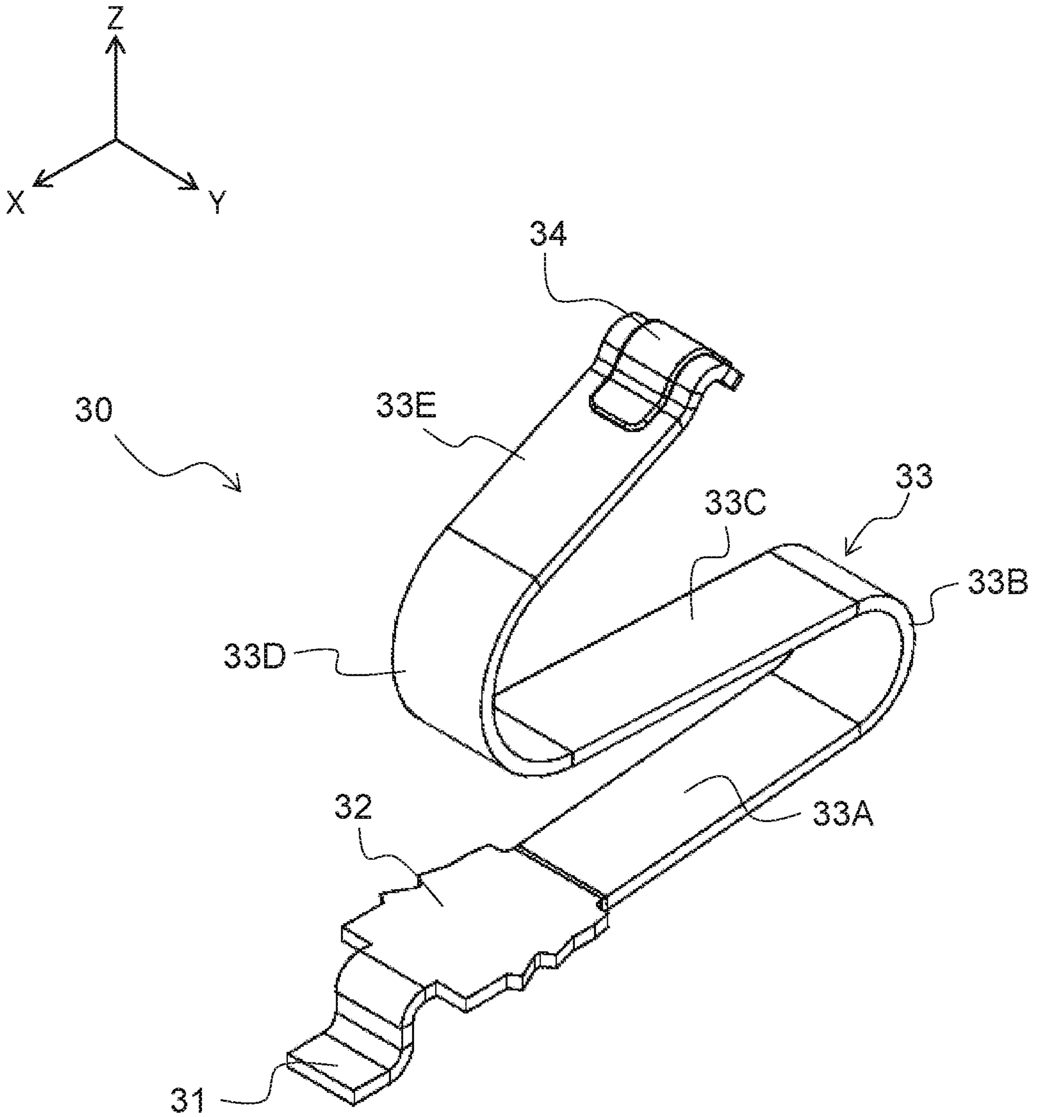
FIG. 9 is a perspective view of a signal terminal.

FIG. 9 is a perspective view of the signal terminal 30.

The signal terminal 30 is a single body including the connection portion 31 for connection to the board 71 serving as the "attachment target" (see FIG. 12), the retained portion 32 retained in the housing 20, a resilient portion 33 for resiliently supporting a contact portion 34, described later, so as to enable the first connector contact portion 34 to displace in a substantially up-down direction, and the contact portion 34 for contacting a central conductor contact portion 83A of the rear member 80 serving as the "connection target", in this order.

The connection portion 31 has a plate thickness direction facing in the up-down direction. The retained portion 32 has a plate thickness direction facing in the up-down direction. Projections are formed at the width direction two sides of the retained portion 32 for being press-fitted into the housing 20. The width dimension (width dimension of portions other than at the projections) of the retained portion 32 is larger than the width dimension of the resilient portion 33.

The resilient portion 33 includes a first extension portion 33A, a first fold-back portion 33B, a second extension portion 33C, a second fold-back portion 33D, and a third extension portion 33E, in this order. The first extension portion 33A extends in the minus X direction, the second extension portion 33C extends in the plus X direction, and the third extension portion 33E extends in the minus X direction. At the first fold-back portion 33B and the second fold-back portion 33D, a plate material for configuring the signal terminal 30 is fold-bended in the plate thickness direction. An extension direction of the first extension portion 33A is inclined slightly in the plus Z direction with respect to the minus X direction, with a gap open in the up-down direction to the bottom wall 21 of the housing 20 (see FIG. 5). The resilient portion 33 includes the two fold-bend portions 33B, 33D, such that the contact portion 34 displaces substantially parallel to the up-down direction.

Ground Terminal 40

Figure 10:
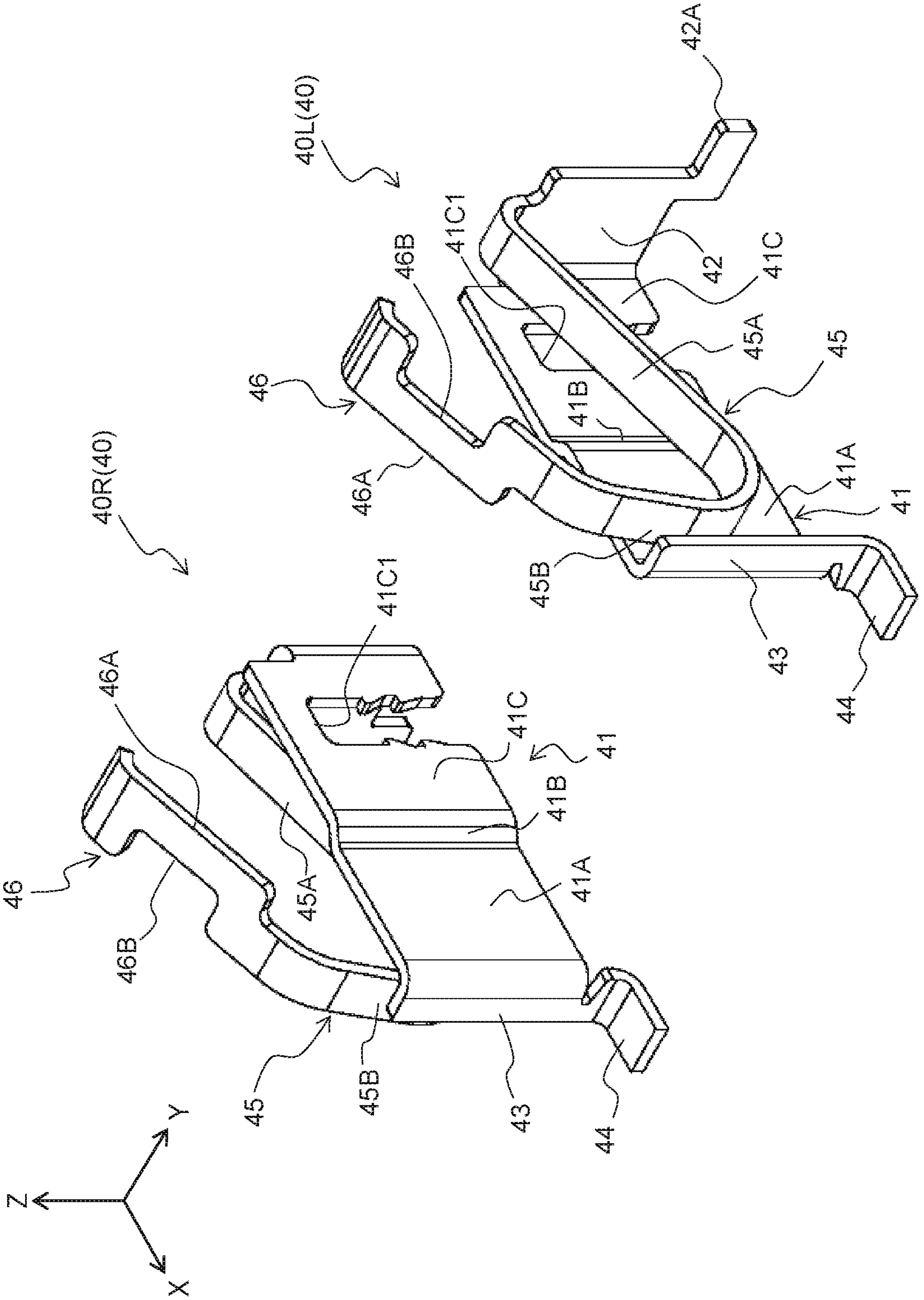
FIG. 10 is a perspective view of a ground terminal.

FIG. 10 is a perspective view of the two ground terminals 40.

The two ground terminals 40 are configured from a right member 40R and a left member 40L. The right member 40R and the left member 40L are configured with structures that are left-right symmetrical to each other. In the following these are both referred to as ground terminals 40 unless particularly discriminating therebetween.

The ground terminals 40 each include the first vertical plate portion 41 serving as an "assist plate", a second vertical plate portion 42, a third vertical plate portion 43, connection portions 42A, 44 for connecting to the board 71, a contact portion 46 for making electrically contiguous contact with the shell 50, and a resilient portion 45 to resiliently support the contact portion 46.

The first vertical plate portion 41 has a plate thickness direction facing in the width direction. More specifically, the first vertical plate portion 41 includes a front portion 41A and a rear portion 41C. The front portion 41A and the rear portion 41C both have a flat plate shape with a plate thickness direction facing in the width direction, and with a step portion 41B formed between the front portion 41A and the rear portion 41C. The front portion 41A of the first vertical plate portion 41 is positioned further to the width direction outside than the rear portion 41C of the first vertical plate portion 41. Each of the first vertical plate portions 41 thereby has a shape running along a width direction outside face of the respective terminal close-proximity wall 24 of the housing 20.

The rear portion 41C of the first vertical plate portion 41 functions as a retained portion retained in the housing 20. More specifically, notch portions 41C1 are formed in the rear portion 41C of the first vertical plate portion 41, cut-out upward from a lower end of the rear portion 41C. Projections are formed in the notch portions 41C1 so as to oppose each other in the front-rear direction. The ground terminals 40 are each retained in the housing 20 by a wall serving as the ground terminal retaining portion 25 of the housing 20 being press-fitted inside the notch portion 41C1.

The second vertical plate portion 42 is formed by fold-bending a rear side of the first vertical plate portion 41 toward the width direction outside. The resilient portion 45 is extended from an upper end of the second vertical plate portion 42. The second vertical plate portion 42 is disposed at a front side of the rear wall 23 of the housing 20.

The third vertical plate portion 43 is formed by fold-bending a front side of the first vertical plate portion 41 toward the width direction outside.

Vertical wall portions 41, 42, 43 having a C-shape in plan view are configured by the first vertical plate portion 41, the second vertical plate portion 42, and the third vertical plate portion 43, with the plate thickness directions thereof facing in directions perpendicular to the up-down direction.

The connection portions 42A, 44 include a front side connection portion 44 and a rear side connection portion 42A. The front side connection portion 44 is formed by fold-bending a lower side of the third vertical plate portion 43 toward the front side. The rear side connection portion 42A is connected to the second vertical plate portion 42 without a bent portion interposed therebetween so as to be formed in the same flat plane as the second vertical plate portion 42.

The resilient portion 45 includes a first extension portion 45A and a second extension portion 45B. The first extension portion 45A is inclined in both the plus X direction and the minus Z direction. The second extension portion 45B is inclined toward the minus X direction on progression in the plus Z direction.

A bent portion is formed between the second extension portion 45B and the contact portion 46 of the resilient portion 45. The contact portion 46 extends in one direction when viewed from the side. The contact portion 46 has a smaller inclination angle toward the plus Z direction with respect to the minus X direction than the second extension portion 45B of the resilient portion 45. The extension direction of the contact portion 46 is substantially parallel to the X direction (see FIG. 7) in a state in which the ground terminals 40 have being deformed greatly.

The contact portion 46 has a shape that is enlarged further toward the width direction inside than the resilient portion 45. The width direction inside end of the contact portion 46 is accordingly positioned further to the width direction inside than the width direction inside end of the resilient portion 45. A width dimension of the contact portion 46 (width dimension not considering a notch portion 46B, described later) is greater than the width dimension of the resilient portion 45. In other words, an enlarged portion 46A enlarged toward the width direction inside is formed to the contact portion 46. The width direction distance between the contact portion 46 of the ground terminal 40 and the third extension portion 33E and the contact portion 34 of the signal terminal 30 is closer due to forming the enlarged portion 46A.

The notch portion 46B cut-out at the width direction outside is formed to the contact portion 46. The rigidity of the contact portion 46 is lowered due to forming the notch portion 46B.

Shell 50

Figure 11:
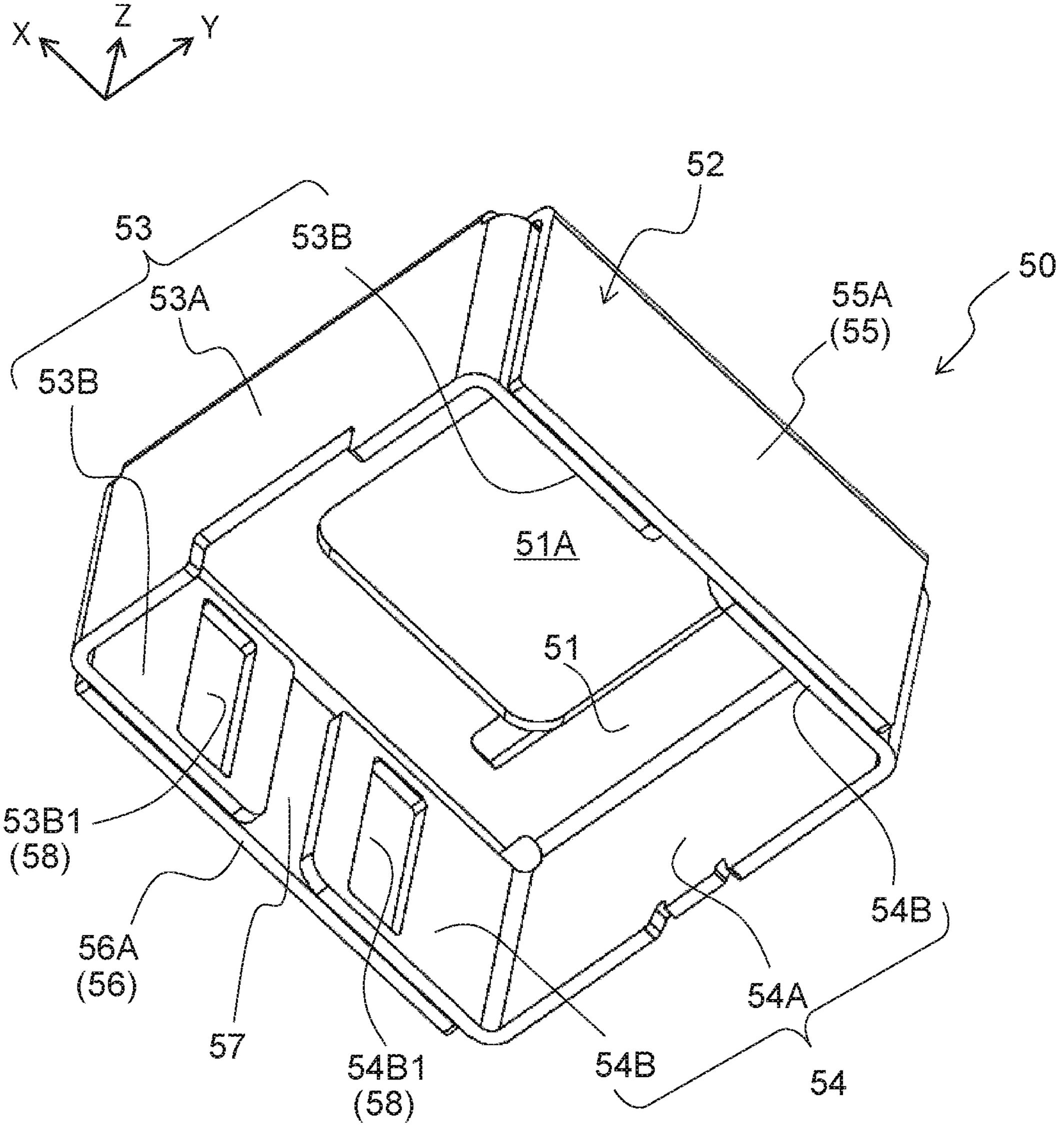
FIG. 11 is a perspective view of a shell as viewed from below.

FIG. 11 is a perspective view of the shell 50 as viewed from below.

The shell 50 is formed from a single sheet of metal.

The shell 50 includes a top face portion 51 and a side face portion 52. The shell 50 accordingly has a cuboidal box shape opening downward.

Figure 16:
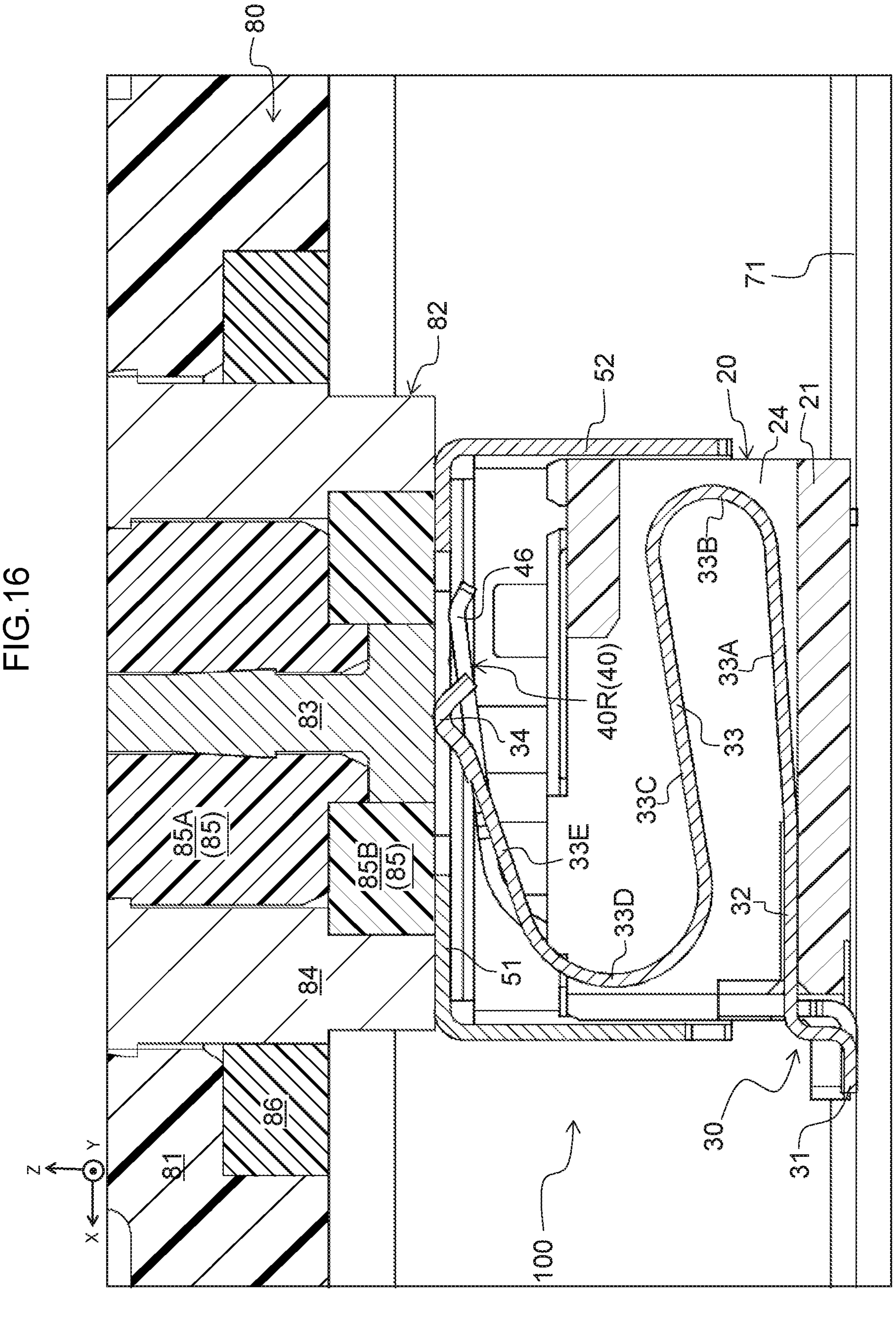
FIG. 16 is a cross-section illustrating an enlargement of a connection structure of a camera module.
Figure 17:
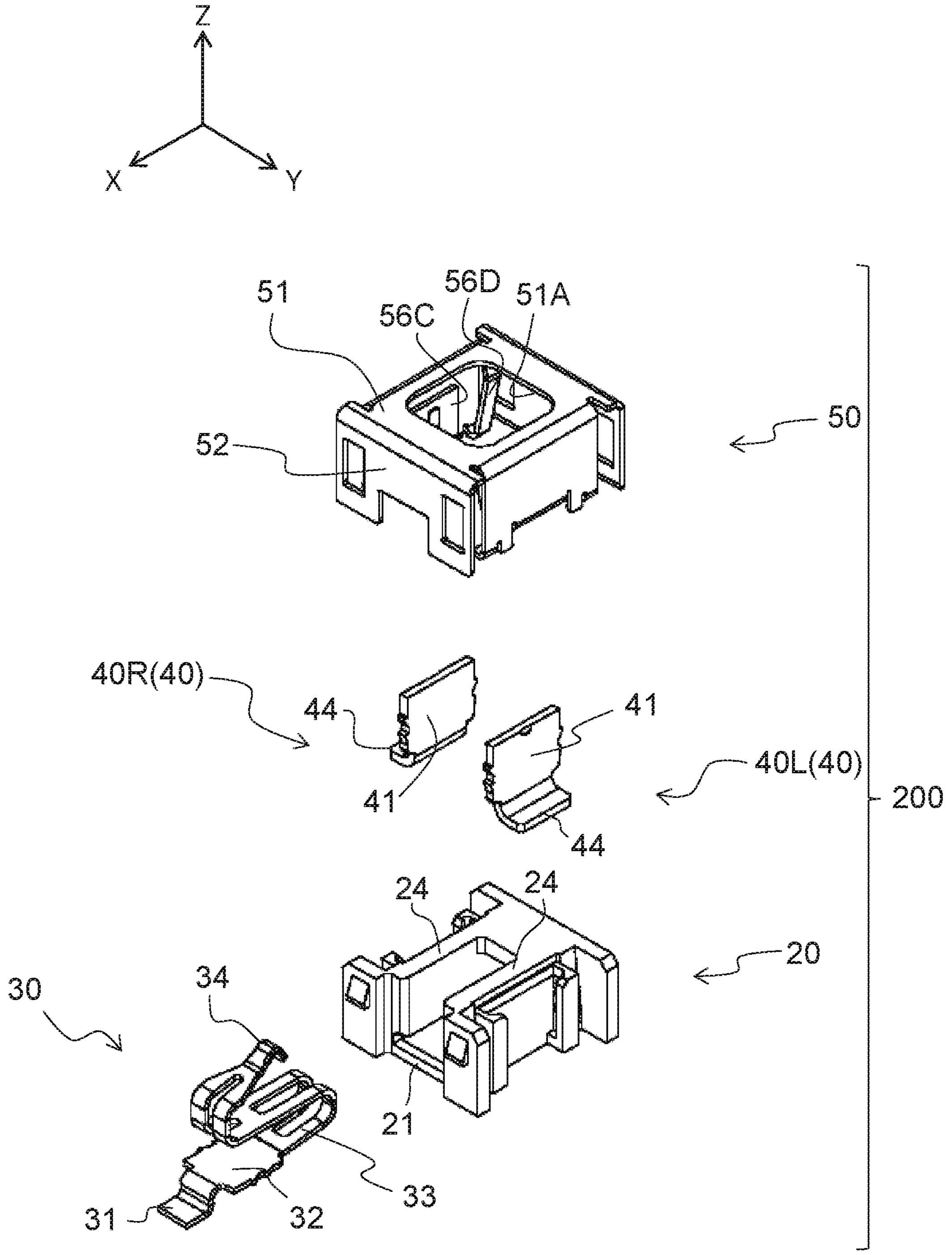
FIG. 17 is an exploded perspective view of a connector according to a second exemplary embodiment.
Figure 18:
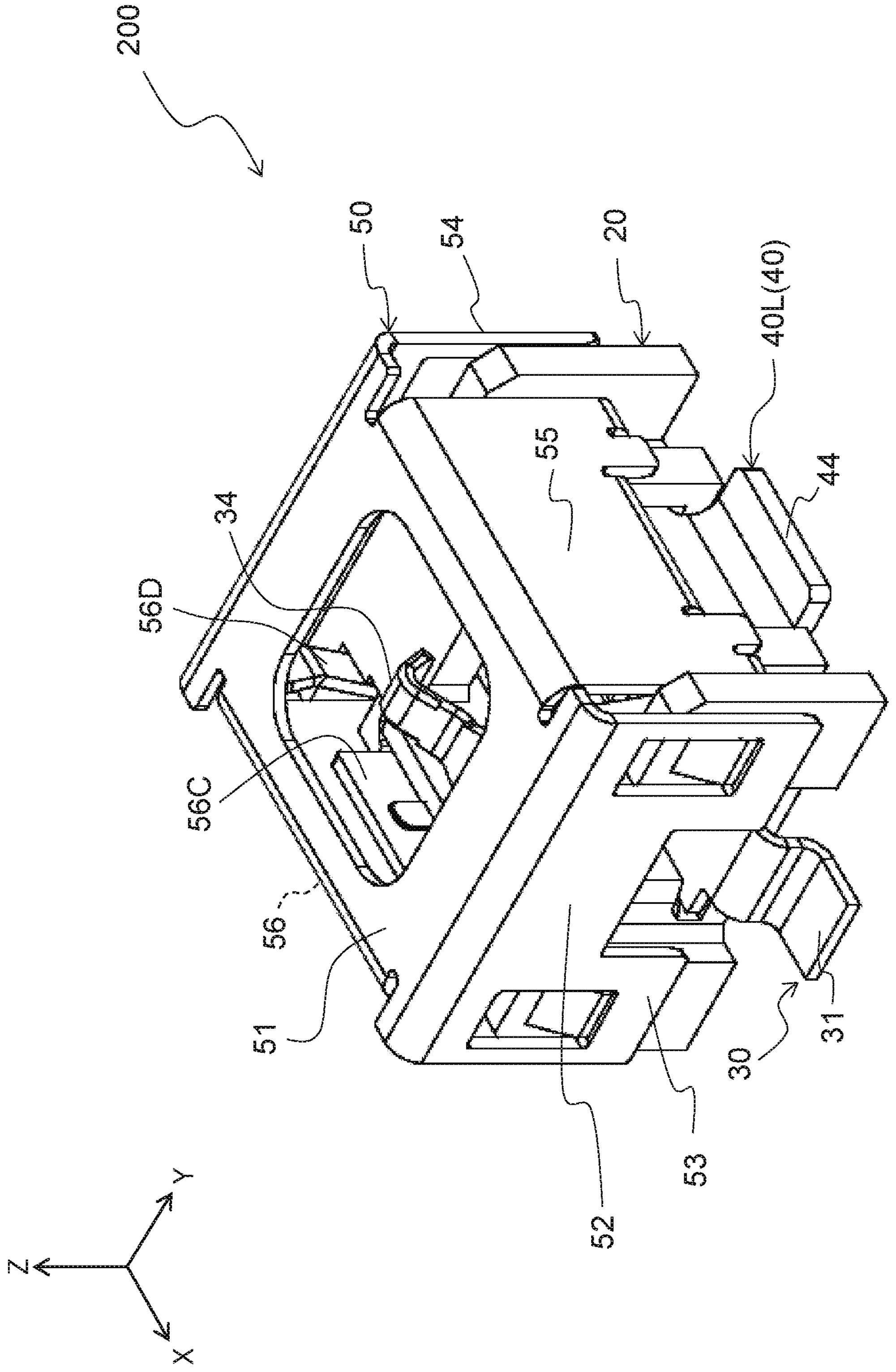
FIG. 18 is a perspective view of a connector according to the second exemplary embodiment.
Figure 19:
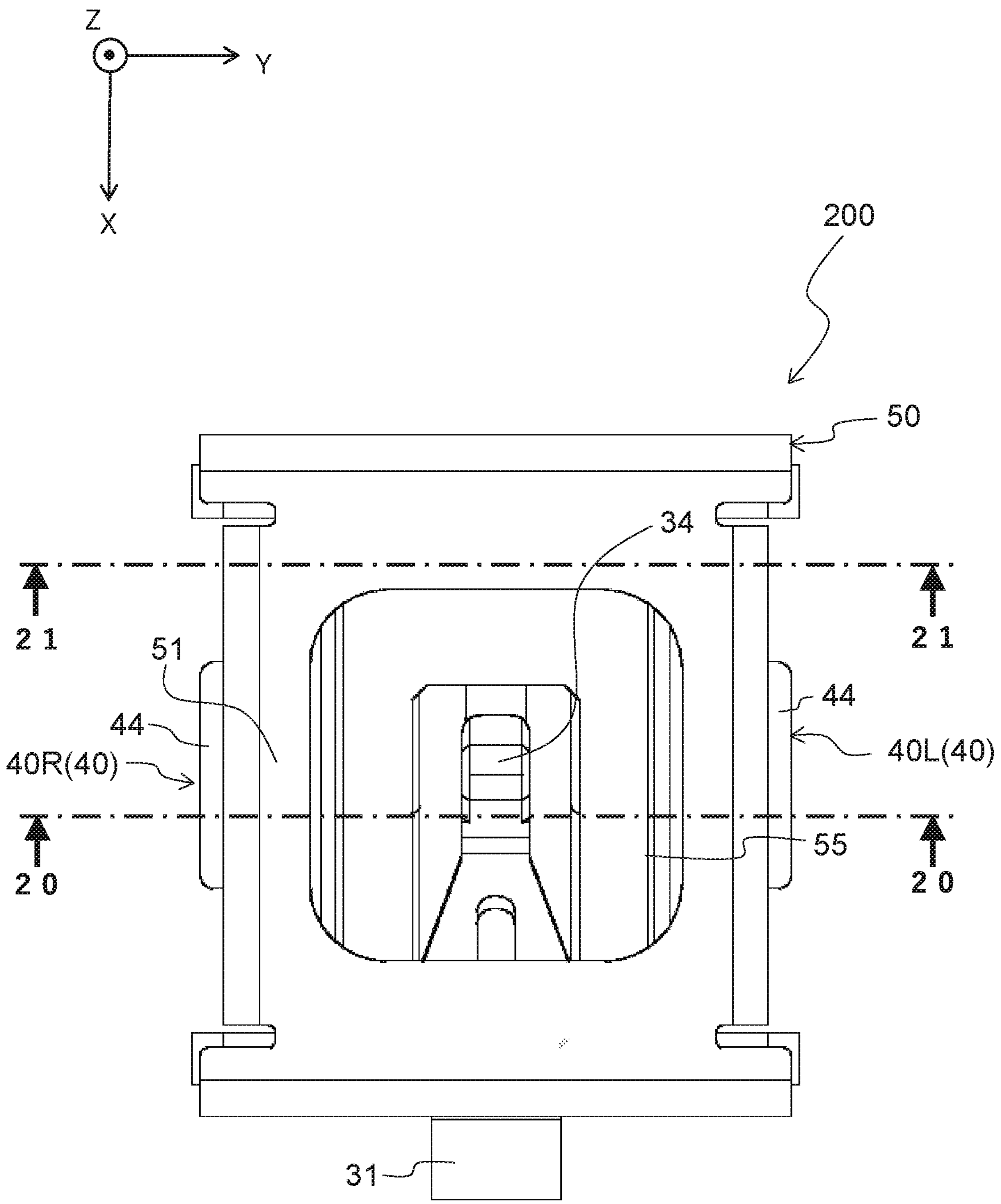
FIG. 19 is a plan view of a connector according to the second exemplary embodiment.

An opening 51A is formed in the top face portion 51. The contact portion 34 of the signal terminal 30 is exposed at the upper side through the opening 51A (see FIG. 3). The opening 51A is formed such that the shell 50 is not in electrically contiguous contact with a central conductor portion 83 of the rear member 80 (see FIG. 16). The opening 51A has a square shape substantially similar in shape to the top face portion 51.

An upper surface of the top face portion 51 makes electrically contiguous contact with an outer conductor contact portion 84A of an outer conductor portion 84 of the rear member 80, and functions as a "shield contact portion". A lower face of the top face portion 51 makes electrically contiguous contact with the contact portions 46 of the ground terminals 40.

The side face portion 52 is configured from four plate portions 53, 54, 55, 56 that are connected to the top face portion 51 through bent portions where an outer edge of the top face portion 51 is bent in a downward direction. The four plate portions 53, 54, 55, 56 are configured from two front-rear plate portions 53, 54 and two left-right plate portions 55, 56.

The two front-rear plate portions 53, 54 are configured from general portions 53A, 54A having a plate thickness direction facing in the X direction and directly connected to the top face portion 51 through respective bent portions, and a pair of overlap portions 53B, 54B where a width direction outside of the general portions 53A, 54A is fold-bended toward the X direction inside.

The two left-right plate portions 55, 56 are configured only from general portions SSA, 56A having a plate thickness direction facing in the width direction and directly connected to the top face portion 51 through bent portions.

The overlap portions 53B, 54B of the front-rear plate portions 53, 54 overlap with the general portions SSA, 56A of the left-right plate portions 55, 56 from the width direction inside. This achieves a configuration in which a gap is not formed at corner portions of the shell 50.

The shell 50 includes guided portions 57 for engaging with the guide portions 22B of the housing 20. The guided portions 57 are portions where the guide portions 22B of the housing 20 are disposed, and are groove shape portions extending in the up-down direction. The guided portions 57 are formed between rear edges of the overlap portions 53B of the front plate portion 53 and front edges of the overlap portions 54B of the rear plate portion 54.

The shell 50 includes placement restriction portions 58 where the upper restriction portions 22A of the housing 20 are disposed. The placement restriction portions 58 are configured by elongated holes 53B1, 54B1 formed in the overlap portions 53B, 54B so as to extend upward and downward.

Next, description follows regarding a completed state of the connector 100.

In the completed state of the connector 100, the shell 50 is able to displace in the Z direction (see FIG. 3 to FIG. 7).

Figure 5:
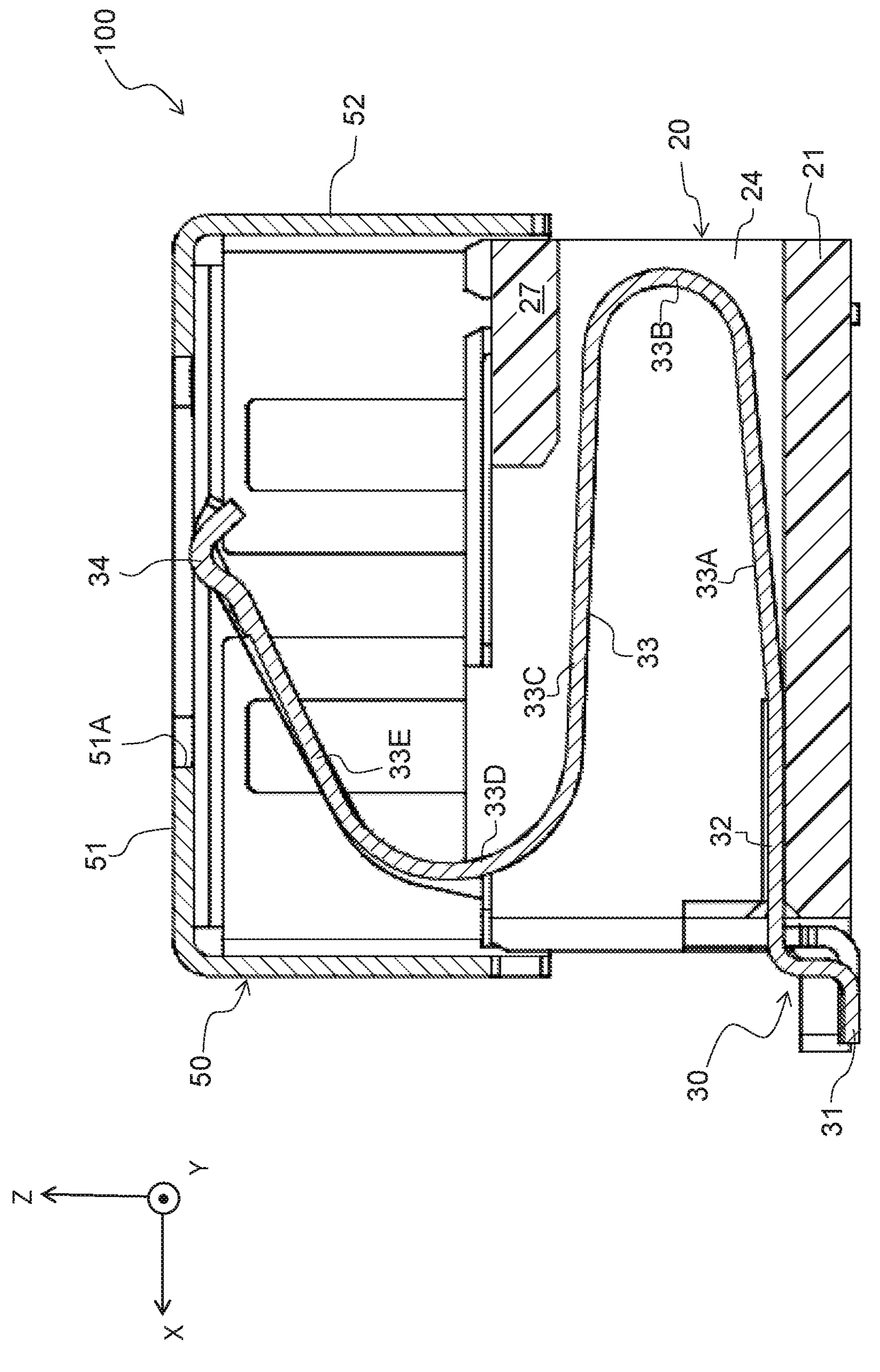
FIG. 5 is a cross-section corresponding to FIG. 3.
Figure 6:
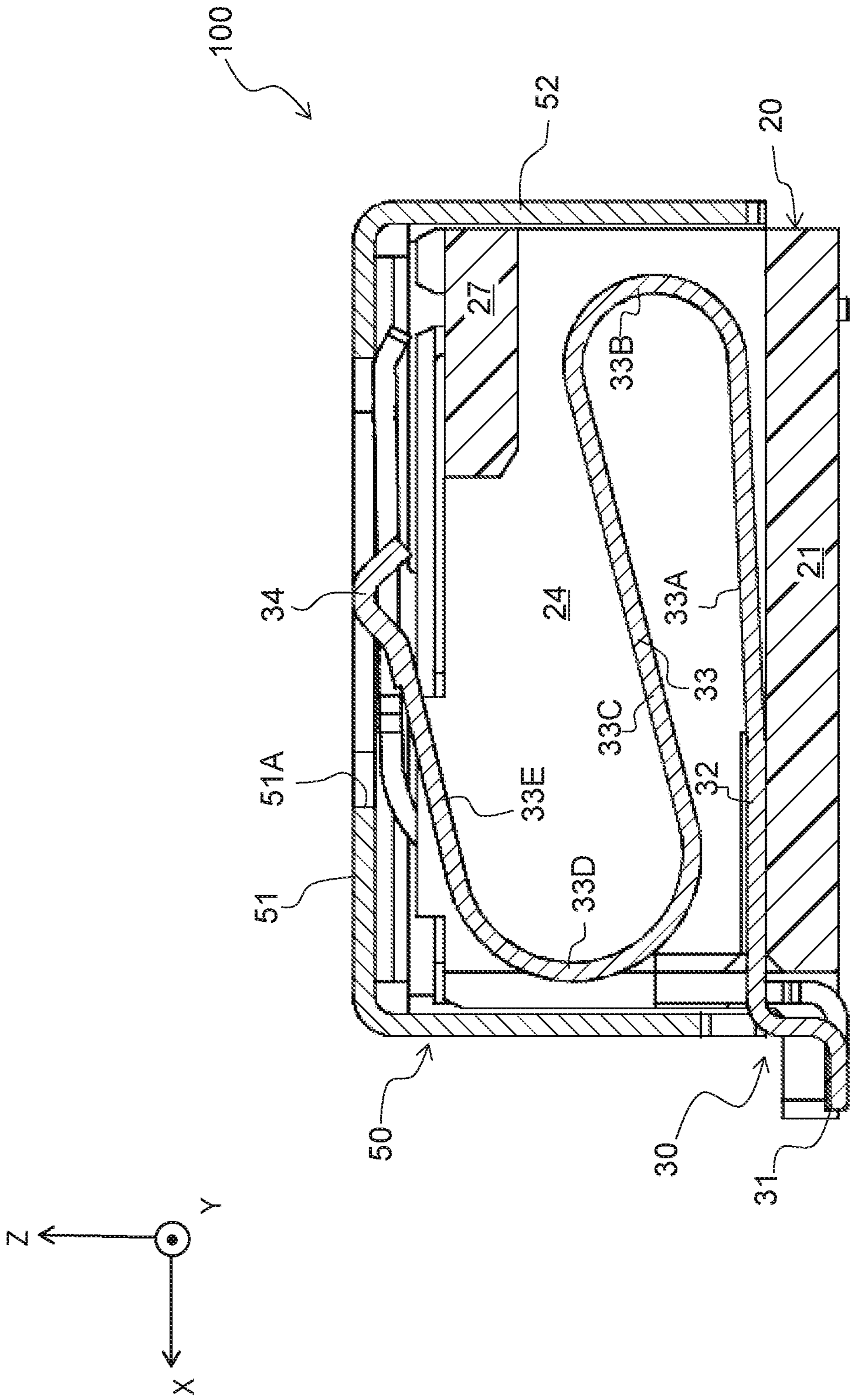
FIG. 6 is a cross-section corresponding to FIG. 4.

FIG. 3 and FIG. 5 illustrate the connector 100 in an initial state. The initial state is a state in which external force is not applied to the shell 50. The contact portions 46 of the pair of ground terminals 40 contact a lower face of the top face portion 51 of the shell 50 from below. The shell 50 is supported by the shell contact portions 46 of the pair of ground terminals 40 when the connector 100 is disposed with downward facing in the direction of gravity.

In the initial state the contact portions 46 of the ground terminals 40 are displaced slightly downward from a free state, and the resilient portion 33 is slightly resiliently deformed. The shell 50 is accordingly biased upward by resilient recovery force of the resilient portion 33. The upper restriction section 22A of the housing 20 is positioned at a lower end of the placement restriction portions 58 of the shell 50, and the shell 50 is in a state bearing downward reaction force from the upper restriction section 22A. Namely, the initial state is a so-called pre-loaded state.

A deformation amount of the resilient portions 45 of the ground terminals 40 increases as the shell 50 is displaced downward from the initial state, and the shell 50 is biased upward by resilient recovery force of the resilient portions 45.

Camera Module 1

FIG. 12 is an exploded cross-section of the camera module 1.

The camera module 1 includes a front member 60 including a front case 61, a rear member 80 including a rear case 81, and an in-built unit 70 including the connector 100, the board 71, a lens 72, and an image sensor 74.

Figure 13:
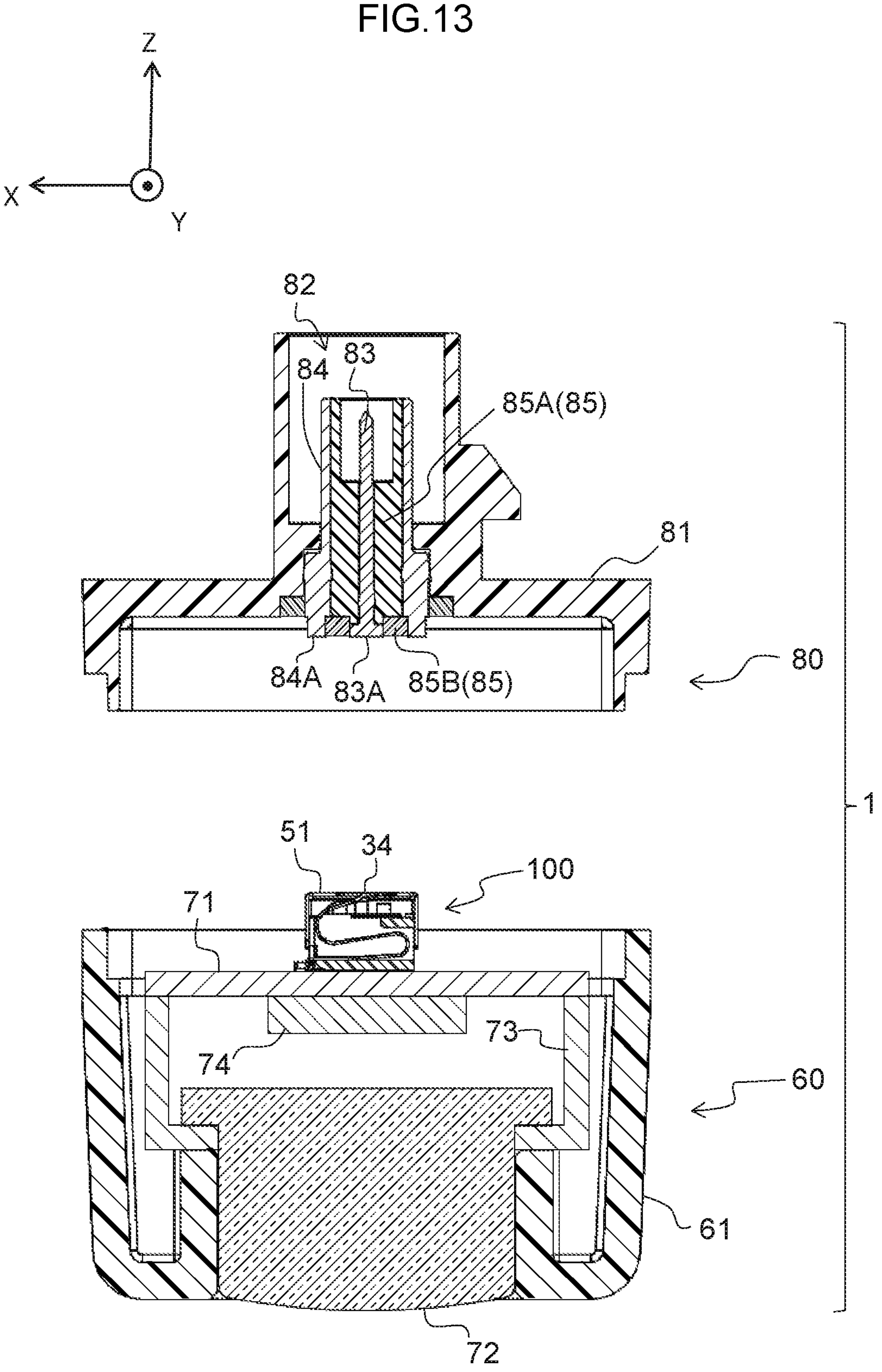
FIG. 13 is a cross-section of partway through assembling a camera module.
Figure 14:
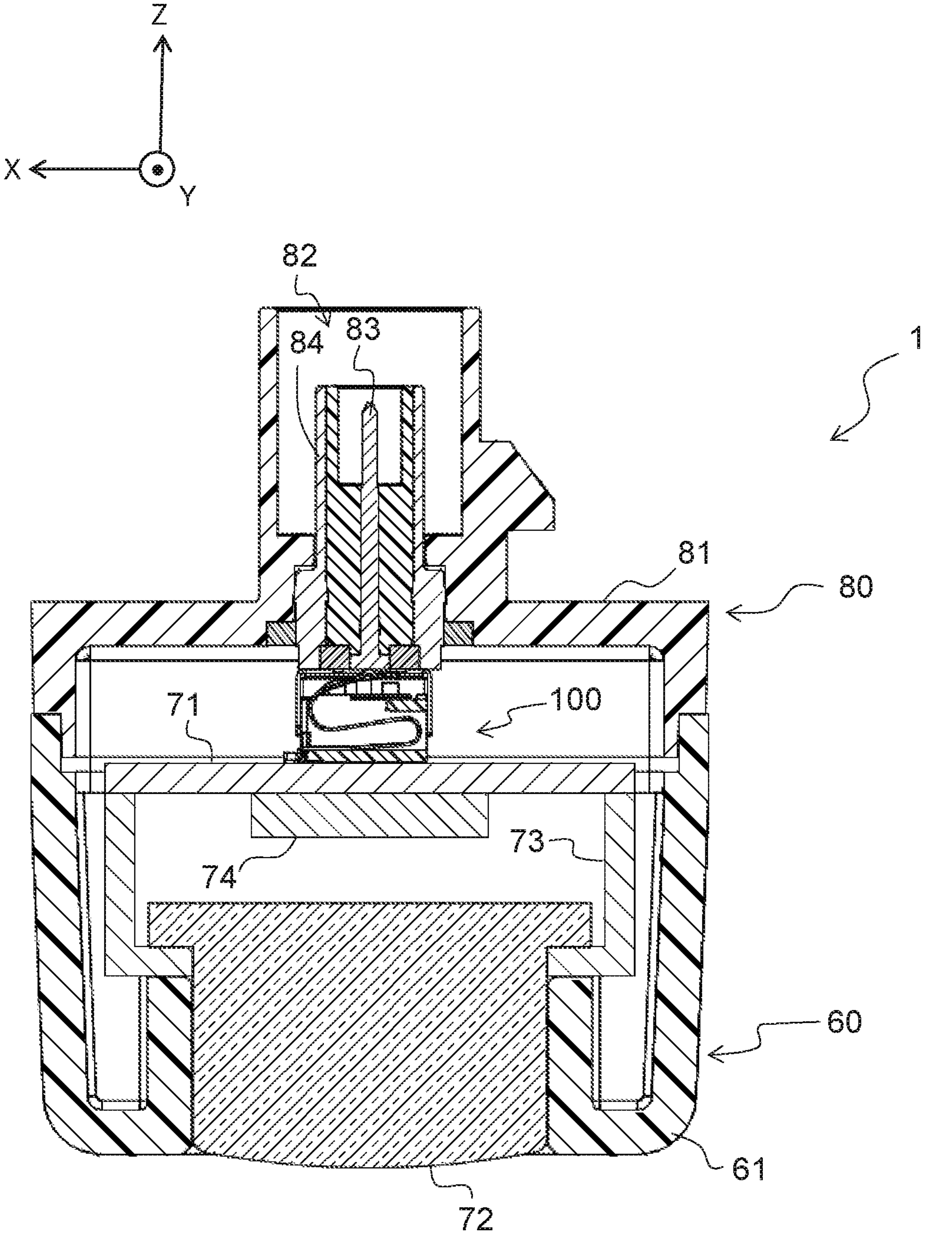
FIG. 14 is a cross-section of a camera module.

The camera module 1 is assembled in the following order (see FIG. 12 to FIG. 14).

1. The in-built unit 70 including the connector 100 and the board 71 is housed in the front case 61.
2. The board 71 is fixed to the front case 61 using screws, adhesive, or the like.
3. The rear member 80 is assembled to the front case 61.
4. The positions of the rear case 81 and the front case 61 are adjusted, and the rear case 81 and the front case 61 are fixed together using welding, adhesive, screws, or the like.

Front Member 60

The front member 60 includes the front case 61. The front case 61 is formed from an insulator such as a synthetic resin.

The front case 61 includes a peripheral wall 61A, a front wall 61B, and a lens retaining portion 61C. The peripheral wall 61A has a substantially square tube shape. The lens retaining portion 61C has a circular cylinder shape. The front wall 61B is formed so as to connect a front end of the peripheral wall 61A and a front end of the lens retaining portion 61C together.

The front case 61 includes board-fixed portions 61D. The board-fixed portions 61D are formed at respective corner portions (four locations) at the inside of the substantially square tube shaped peripheral wall 61A. The board-fixed portions 61D are configured by substantially square column shapes upstanding from the front wall 61B in the plus Z direction.

Rear Member 80

The rear member 80 includes a rear case 81 formed from an insulator such as a synthetic resin, and a coaxial connector section 82.

The rear case 81 includes a peripheral wall 81A, a rear wall 81B, and a case projection portion 81C that projects from the rear wall 81B in the plus Z direction. The peripheral wall 81A has a substantially square tube shape. The case projection portion 81C has a substantially circular cylinder shape.

The coaxial connector section 82 includes a central conductor portion 83, an outer conductor portion 84, and an insulation portion 85 that insulates between the central conductor portion 83 and the outer conductor portion 84.

The central conductor portion 83 extends along the up-down direction. A lower end face of the central conductor portion 83 configures the central conductor contact portion 83A (see FIG. 15). The central conductor contact portion 83A is a circular shaped flat plane having a normal direction facing in the minus Z direction.

The outer conductor portion 84 extends along the up-down direction in a circular cylinder shape. A lower end face of the outer conductor portion 84 is configured by the outer conductor contact portion 84A. The outer conductor contact portion 84A is a flat surface having a normal direction facing in the minus Z direction, and extends in a circumferential shape so as to surround the central conductor contact portion 83A (see FIG. 15).

The insulation portion 85 includes a main body portion 85A and a leading end portion 85B. The main body portion 85A is configured at an upper portion of the insulation portion 85, and the leading end portion 85B is configured at a lower portion of the insulation portion 85. The leading end portion 85B functions such that a lower end face (the central conductor contact portion 83A) of the central conductor portion 83 and a lower end face (the outer conductor contact portion 84A of the outer conductor portion 84 are connected together smoothly so as to form a contact face 82A of the coaxial connector section 82 (see FIG. 15). The contact face 82A of the coaxial connector section 82 is a circular shaped flat plane having the minus Z direction as a normal direction thereto.

Configuration is such that part of an opening side (minus Z direction side) of the peripheral wall 81A of the rear case 81 enters inside the peripheral wall 61A of the front case 61. This thereby achieves a configuration in which a relative position in the XY directions of the rear case 81 with respect to the front case 61 is somewhat determined even in a state prior to the rear case 81 and the front case 61 being fixed together by welding, adhesive, screws, or the like.

In-Built Unit 70

As illustrated in FIG. 12, the in-built unit 70 includes the connector 100, the board 71, the lens 72, a holder 73, and the image sensor 74. The connector 100 is mounted to an upper face of the board 71. The image sensor 74 is attached to a lower face of the board 71. The lens 72 is attached to the lower side of the board 71 using the holder 73. Each component is fixed in a state in which the lens 72 and the image sensor 74 have been accurately positionally aligned.

The board 71 has a square shape as viewed in the Z direction, and the holder 73 has a circular shape as viewed in the Z direction. The four corner portions of the board 71 are fixed to an upper face (plus Z direction face) of the board fixing portion 61D of the front case 61 using screws, adhesive, or the like.

When assembling the rear member 80, the coaxial connector section 82 of the rear member 80 contacts the shell 50 of the connector 100 from the plus Z direction. The shell is accordingly pressed-in in the plus Z direction.

In a completed state of the camera module 1, the relative position of the connector 100 and the coaxial connector section 82 is one that is affected by assembly tolerance between the front case 61 and the rear case 81, by the attachment position of the board 71 with respect to the front case 61, and the like.

However, the contact face 82A of the coaxial connector section 82 is configured by the flat surface facing in the minus Z direction, and so misplacement in the XY directions can be accommodated. Moreover, misplacement in the Z direction can be absorbed due to the shell 50 of the connector 100 being able to displace downward. The contact portion 34 of the signal terminal 30 and the shell 50 are resiliently displaced downward so as to be in a state biased in the plus Z direction, giving electrically contiguous contact with contact pressure between the coaxial connector section 82 and the signal terminal 30 and the shell 50.

Operation and Advantageous Effects

Next, description follows regarding the operation and advantageous effects of the present exemplary embodiment.

As illustrated in FIG. 1, in the present exemplary embodiment the connector 100 includes the signal terminal 30, the housing 20 that retains the signal terminal 30, and the shell 50 surrounding at least part of the signal terminal 30. The signal terminal 30 includes the terminal contact portion 34 capable of electrically contiguous contact with the inner conductor contact portion 83A of the connection target 80 connected from an Z direction one side, and the shell 50 includes the shield contact portion 51 that makes electrically contiguous contact with the outer conductor contact portion 84A of the connection target 80.

Figure 4:
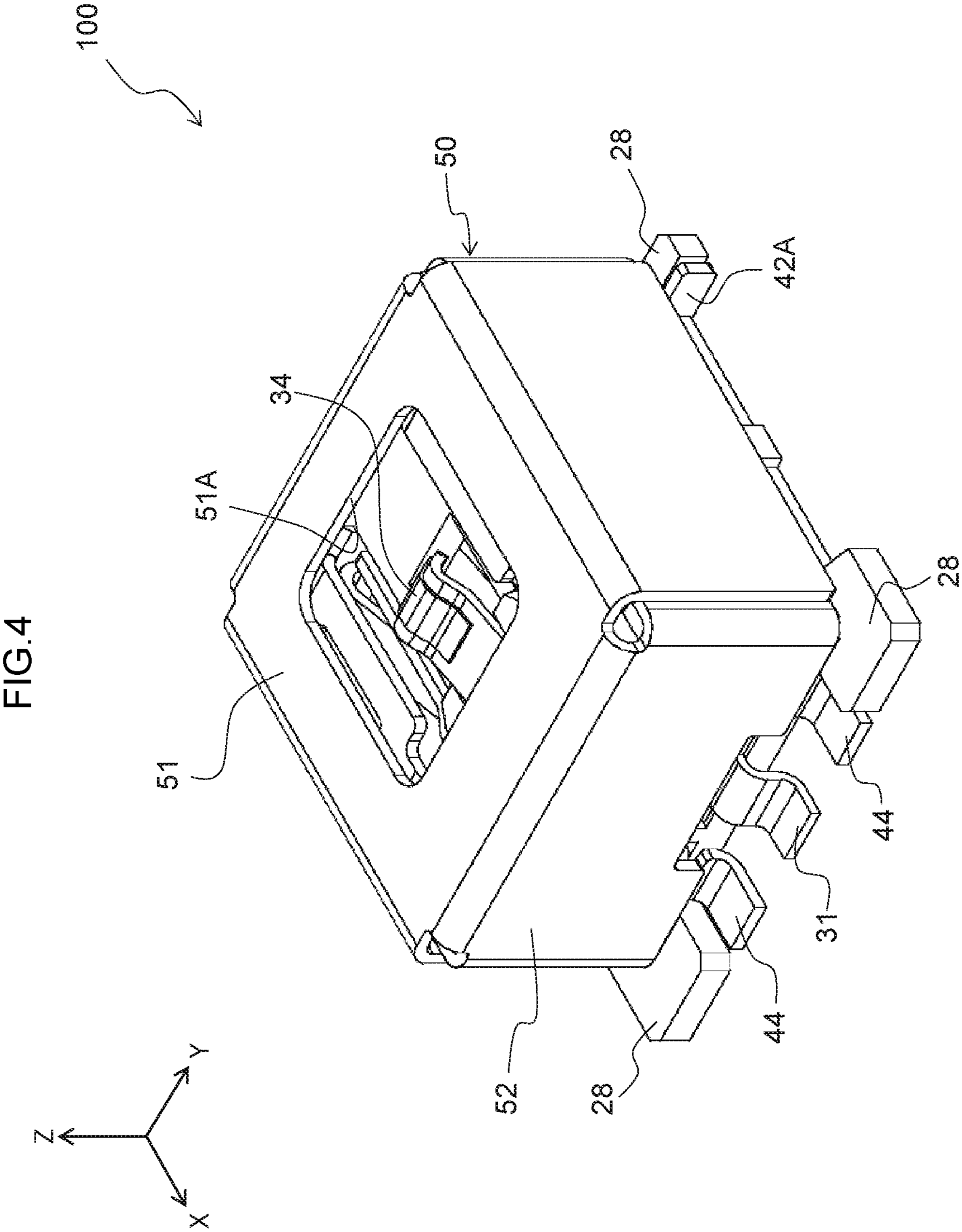
FIG. 4 is a perspective view of a connector (in a shell greatly displaced state) according to the first exemplary embodiment.

As illustrated in FIG. 3 and FIG. 4, the shell 50 including the shield contact portion 51 is able to displace in the Z direction. Positional misplacement in the Z direction between the connector 100 and the connection target 80 (for example, misplacement due to assembly tolerance) can accordingly be absorbed.

Moreover, in the present exemplary embodiment the shell 50 includes the flat plate shaped top face portion 51 having a plate thickness direction facing in the Z direction. The opening 51A is formed at a center of the top face portion 51 so as to expose the terminal contact portion 34. This thereby enables an area on the upper face of the top face portion 51 encircling the opening 51A to be caused to function as the shield contact portion 51.

Moreover, in the present exemplary embodiment the shell 50 includes the side face portion 52 extending downward from outer edges of the top face portion 51. The side face portion 52 of the shell 50 surrounds the signal terminal 30 from directions orthogonal to the Z direction. This thereby improves noise countermeasures.

Moreover, in a state in which the connector 100 is connected to the connection target (hereafter referred to as a connected state), the shell 50 is positioned at a lower side (minus Z direction side) compared to the initial state (FIG. 3), and so an unshielded range further toward the lower side than side face portion 52 of the shell 50 is decreased in the connected state compared to in the initial state.

Moreover, in the present exemplary embodiment, as illustrated in FIG. 11, the side face portion 52 of the shell 50 is configured by the respective plural plate portions 53, 54, 55, 56 that are each connected to the top face portion 51 through bent portions. Parts of adjacent plate portions from out of the plural plate portions 53, 54, 55, 56 are overlapped with each other. This thereby suppresses gaps from being formed between adjacent plate portions from out of the plural plate portions 53, 54, 55, 56.

Moreover, in the present exemplary embodiment the connector 100 includes the resilient support portions 45, 46 that resiliently support the shell 50 so as to allow the shell 50 to displace in the Z direction. Thus by displacing the shell 50 toward the Z direction other side to achieve the connected state, the shield contact portion 51 can be placed in pressed contact against the connection target 80.

Moreover as illustrated in FIG. 8, in the present exemplary embodiment the housing includes the pair of terminal close-proximity walls 24 opposing each other in the Y direction, with the signal terminal 30 disposed between the pair of terminal close-proximity walls 24.

The connector 100 includes the pair of assist plates 41. The pair of assist plates 41 have plate thickness directions facing in the Y direction, and are disposed at the Y direction outside with respect to the pair of terminal close-proximity walls 24. Thus part of the housing 20 is disposed so as to be adjacent in the Y direction to the signal terminal 30, with the assist plates 41 disposed at the outside thereof, so as to thereby enable the impedance of the signal terminal 30 to be adjusted to achieve a connector 100 compatible with high speed transmission.

Moreover, in the present exemplary embodiment the retained portion 32 of the signal terminal 30 is press-fitted and retained between the pair of terminal close-proximity walls 24 from an X direction one side. The portions of the pair of terminal close-proximity walls 24 into which the retained portion 32 is press-fitted (front portions 24A of the terminal close-proximity walls 24) have Y direction outside faces enlarged toward the Y direction outside compared to other portions thereof. The pair of assist plates 41 are shaped so as to follow Y direction outside faces of the pair of terminal close-proximity walls 24. This means that a Y direction distance between the signal terminal 30 and the assist plates 41 is close to being fixed without varying depending on position in the X direction, the impedance is adjusted, and transmission performance is raised.

Moreover, in the present exemplary embodiment the connector 100 includes the ground terminals 40 that electrically contiguously connect the attachment target 71, to which the connector 100 is attached, and the shell 50 together. This thereby enables more stable high speed transmission performance to be secured than an embodiment in which the shell 50 is not electrically contiguously connected to the attachment target 71.

Moreover, in the present exemplary embodiment the shell 50 and the ground terminals 40 are separate bodies. The ground terminals 40 include the resilient support portions 45, 46 that resiliently support the shell 50 so as to allow the shell 50 to displace in the Z direction, and the resilient support portions 45, 46 include the shell contact portions 46 that electrically contiguously connect the ground terminals 40 and the shell 50 together by making electrically contiguous contact with the shell 50. This enables resilient support of the shell and electrically contiguous connection between the shell 50 and the ground terminals 40, to both be performed by the resilient support portions 45, 46.

Moreover, in the present exemplary embodiment, the signal terminal 30 includes the leading-end-side extension portions 33E, 34 including the first connector contact portion 34 at the extension direction leading end side, and the ground terminals 40 include the pair of leading-end-side extension portions 46 including the shell contact portions 46 that contact the shell 50 at the extension direction leading end side.

The leading-end-side extension portions 33E, 34 of the signal terminal 30, and the pair of leading-end-side extension portions 46 of the ground terminals 40 extend in the same specific direction as viewed in the Z direction. Furthermore, the pair of leading-end-side extension portions 46 of the ground terminals 40 are disposed at both Y direction sides with respect to the leading-end-side extension portions 33E, 34 of the signal terminal 30. One of the leading-end-side extension portions 46 of the ground terminals 40, the leading-end-side extension portions 33E, 34 of the signal terminal 30, and the other leading-end-side extension portion 46 of the ground terminals 40 accordingly function as a ground-shield-ground structure (GSG structure), and the transmission characteristics are improved.

Moreover, in the present exemplary embodiment the direction in which the shield contact portion 51 contacts the second contact portion 84A of the connection target 80, and the direction in which the terminal contact portion 34 contacts the first contact portion 83A of the connection target 80, are both the Z direction. This accordingly enables the shape of the signal terminal 30 to be more simple than an embodiment in which, for example, the contact direction of the terminal contact portion 34 is a direction perpendicular to the Z direction.

Moreover as illustrated in FIG. 5, in the present exemplary embodiment the shield contact portion 51 is positioned further to the Z direction one side than the terminal contact portion 34 in the initial state. This accordingly facilitates first contact of the shield contact portion 51 when being contacted to the connection target 80.

Figure 15:
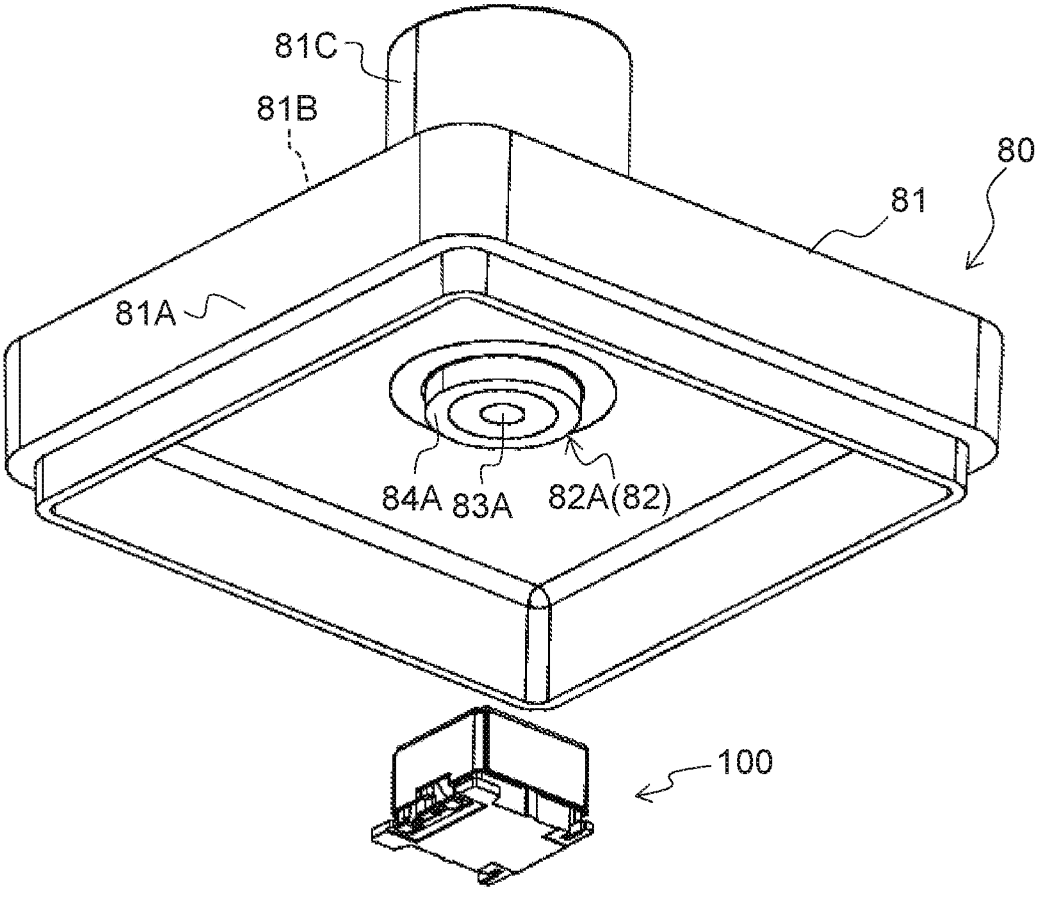
FIG. 15 is a perspective view illustrating a rear member and a connector.

Moreover as illustrated in FIG. 15, the connection structure in the present exemplary embodiment is the connection structure between the connection target 80 and the connector 100. The connector 100 includes the signal terminal 30 including the first connector contact portion 34, the shield members 40, 50 including the second connector contact portion 51, and the housing 20, with the connector 100 contacting the connection target 80 from the Z direction other side. The connection target 80 includes the inner conductor portion 83 and the outer conductor portion 84. The inner conductor contact portion 83A of the inner conductor portion 83 contacts the first connector contact portion 34 of the connector 100, and the outer conductor contact portion 84A of the outer conductor portion 84 contacts the second connector contact portion 51 of the connector 100.

The outer conductor portion 84 surrounds the inner conductor portion 83. The high speed transmission performance is accordingly raised thereby due to the outer conductor portion 84 shielding the inner conductor portion 83.

Moreover, the inner conductor contact portion 83A is able to be abutted against the first connector contact portion 34 in the Z direction, and the outer conductor contact portion 84A is able to be abutted against the second connector contact portion 51 in the Z direction. This means that contact between the first connector contact portion 34 and the inner conductor contact portion 83A, and contact between the second connector contact portion 51 and the outer conductor contact portion 84A, are both abutting contact in the Z direction. This enables relative positional misplacement between the connection target 80 and the connector 100 to be accommodated in directions orthogonal to the Z direction, which is the abutting direction.

Moreover, in the present exemplary embodiment the inner conductor contact portion 83A and the outer conductor contact portion 84A are both flat surfaces having a normal direction toward the Z direction other side, and are both aligned in position in the Z direction. This thereby enables any relative positional misplacement between the connection target 80 and the connector 100 to be accommodated more smoothly in directions orthogonal to the Z direction, which is the abutting direction.

Moreover, in the present exemplary embodiment the coaxial connector section 82 formed by the inner conductor portion 83 and the outer conductor portion 84, and the first connector contact portion 34 and the second connector contact portion 51 of the connector 100 make abutting contact with each other.

However, there is a need for the second connector contact portion 51 of the connector 100 to be able to contact the outer conductor contact portion 84A, and the connector 100 sometimes becomes bulky in the X direction and the Y direction in order to realize this. For example, in a connection structure described in JP-A No. 2016-162556, a recess is formed to a housing of the connector, and a second connector contact portion (leading end portion of a receptacle ground pin) is disposed in this recess. This means that a recess needs to be formed in the housing for the outer conductor portion of the connection target to enter into, with the housing becoming bulky in the X direction and the Y direction, and as a result the connector also becoming more bulky.

In the present exemplary embodiment the connector 100 includes the shell 50 including the top face portion 51 and the side face portion 52, with the shell 50 disposed so as to be covered by the housing 20 from the Z direction one side. The face on the Z direction one side of the top face portion 51 of the shell 50 functions as the second connector contact portion 51.

There is accordingly no need to form a recess in the housing for the outer conductor portion of the connection target to enter into, and furthermore, a wide area on the Z direction one side of the connector can be caused to function as the second connector contact portion 51. As a result the connector can be made more compact in the X direction and the Y direction.

Moreover, a signal line configured by the signal terminal 30 and the central conductor portion 83 can be surrounded by the outer conductor portion 84 and the shell 50. Namely, a gap does not arise between the outer conductor portion 84 and the shell 50.

Second Exemplary Embodiment

FIG. 17 to FIG. 21 illustrate a connector 200 of a second exemplary embodiment.

The connector 200 includes a housing 20, a signal terminal 30, two ground terminals 40R, and a shell 50.

The ground terminals 40 each include a first vertical plate portion 41 having a plate thickness direction facing in the width direction, and a connection portion 44 formed by fold-bending a lower side of the first vertical plate portion 41. The first vertical plate portion 41 functions as a retained portion press-fitted into the housing 20 and retained therein. The first vertical plate portions 41 are disposed at the width direction outside of a pair of terminal close-proximity walls 24 of the housing 20, and function as assist plates. The faces on the width direction outside of the first vertical plate portions 41 make electrically contiguous contact with the shell 50, and function as shell contact portions. The connection portion 44 is connectable to the board 71.

Figure 20:
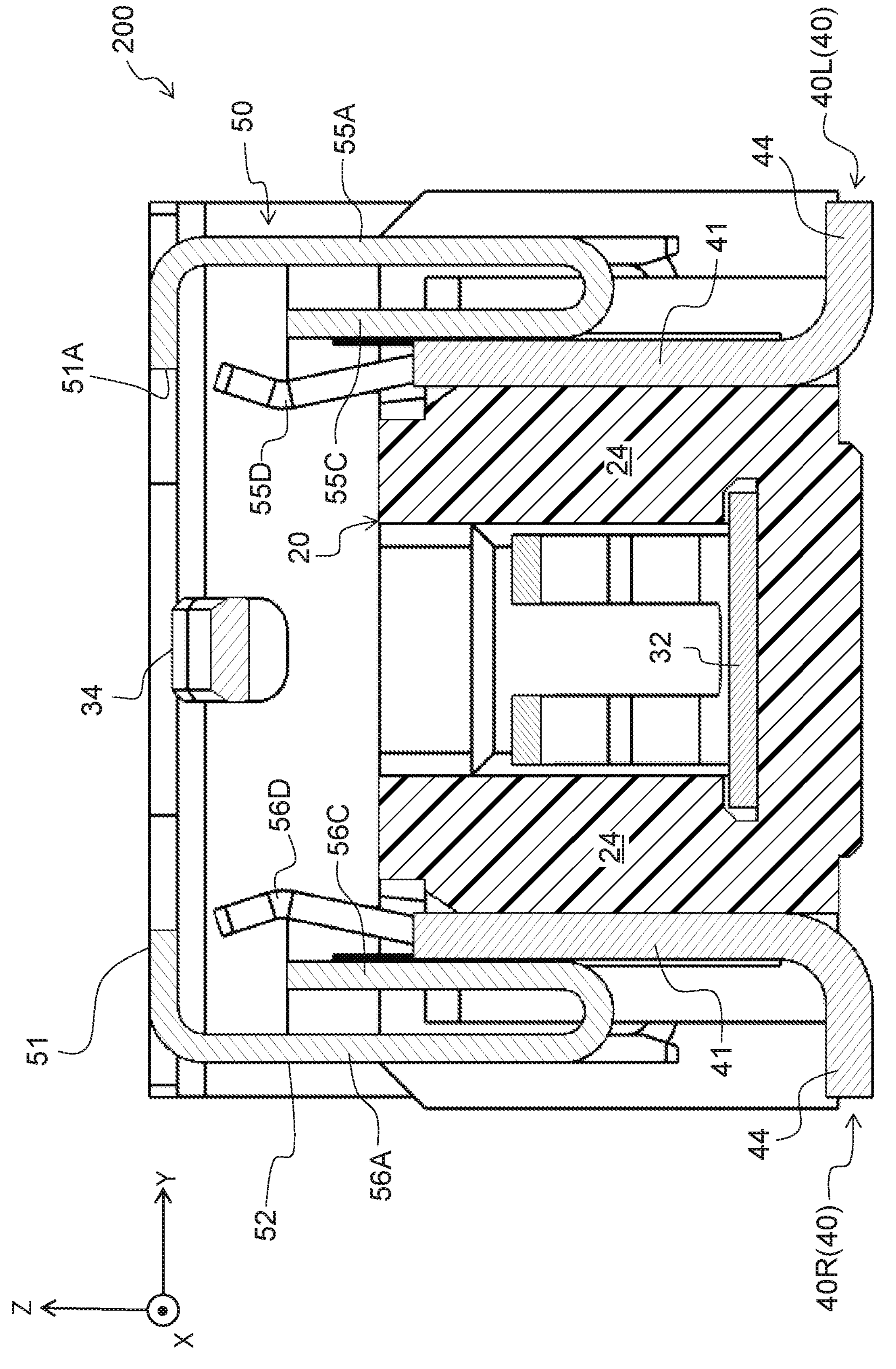
FIG. 20 is a cross-section taken along line 20-20 of FIG. 19.

As illustrated in FIG. 20, the shell 50 includes inside fold-bend portions 55C, 56C. The inside fold-bend portions 55C, 56C make electrically contiguous contact with the width direction outside faces of the first vertical plate portions 41 of the ground terminals 40. The inside fold-bend portions 55C, 56C are formed by fold-bending a lower side of a plate width direction (front-rear direction) central portion of left and right plate portions 55, 56 of the shell 50 by substantially 180° toward the width direction inside.

Figure 21:
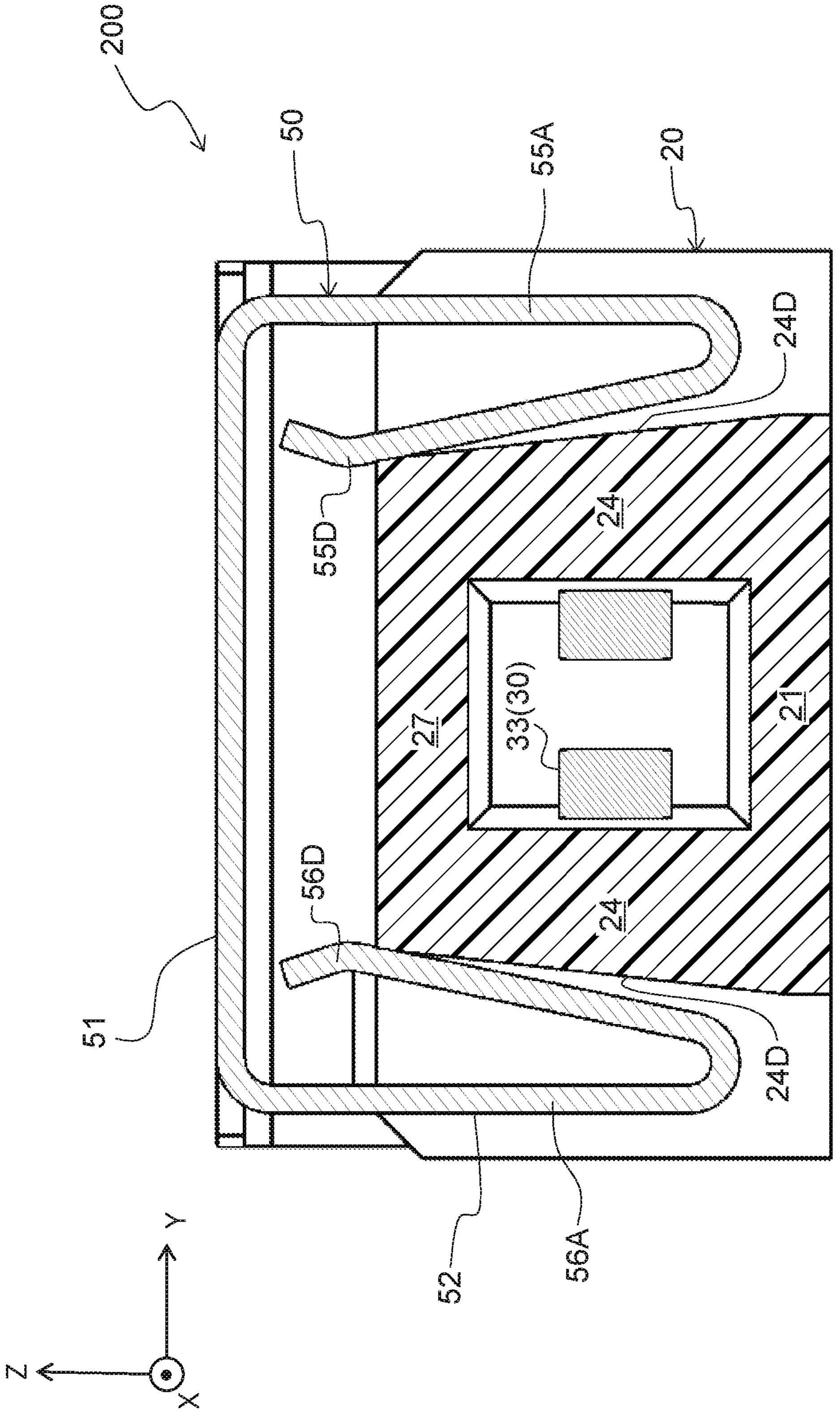
FIG. 21 is a cross-section taken along line 21-21 of FIG. 19.

As illustrated in FIG. 21, the shell 50 includes spring tabs 55D, 56D serving as "resilient support portions". The spring tabs 55D, 56D resiliently support the shell 50 itself so as to enable the shell 50 to displace in the up-down direction.

More specifically, the spring tabs 55D, 56D are formed by fold-bending a lower side of both plate width direction outside portions of the left and right plate portions 55, 56 of the shell 50 toward the width direction inside. The spring tabs 55D, 56D make contact with inclined faces 24D of the housing 20. The inclined faces 24D of the housing 20 are flat surfaces having normal directions facing in directions inclined toward the plus Z direction with respect to the width direction outside. When the shell 50 is displaced downward, the amount of deformation of the spring tabs 55D, 56D increases. This means that when the shell 50 is displaced downward, the shell 50 is biased in the plus Z direction by recovery force of the spring tabs 55D, 56D. Thus by adopting the configuration in the present exemplary embodiment such that the resilient support portions 55D, 56D that are integrally formed as a single body with the shell 50 contact the housing 20, the shell 50 is resiliently supported so as to be able to displace in the Z direction.

Third Exemplary Embodiment

Figure 22:
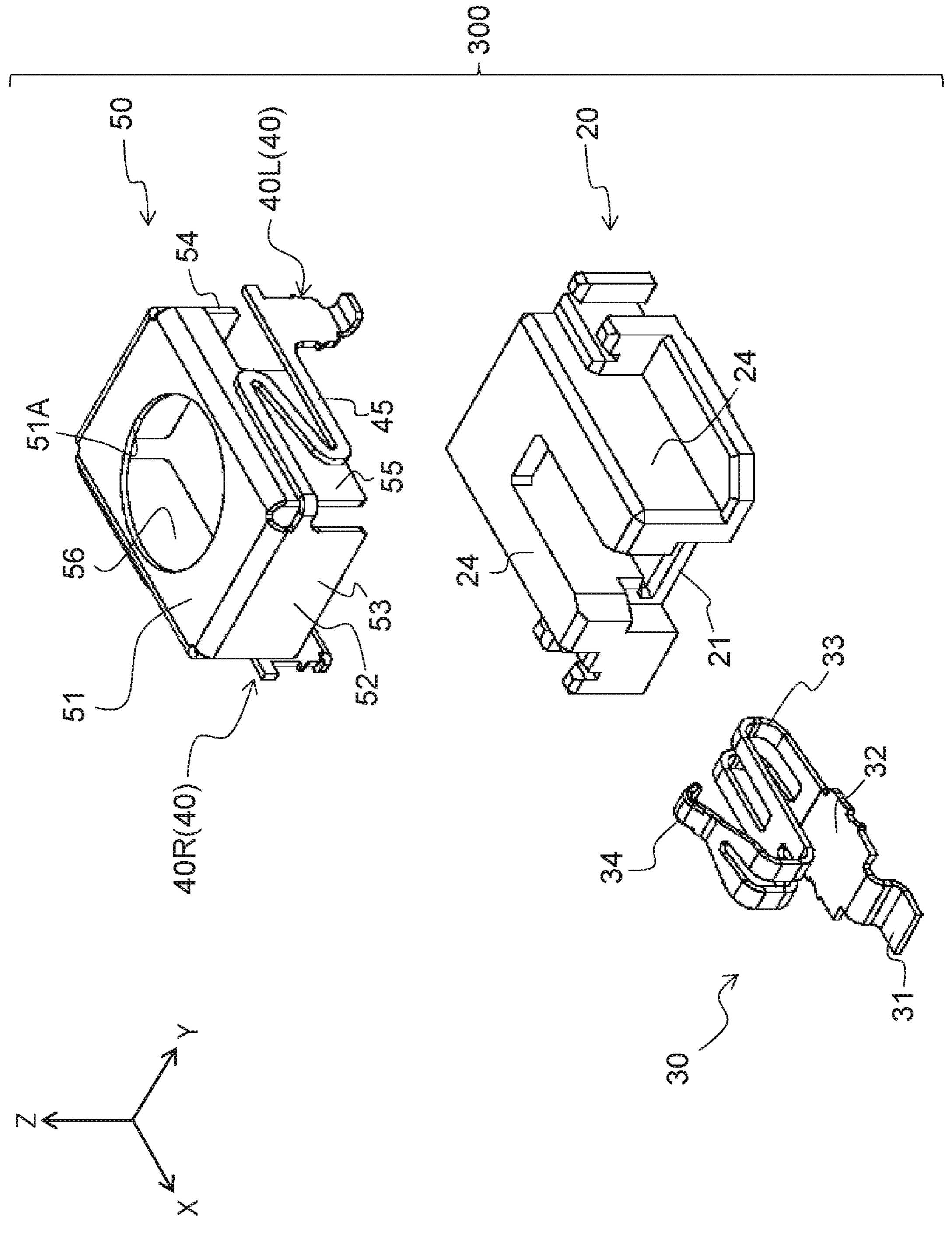
FIG. 22 is an exploded perspective view of a connector according to a third exemplary embodiment.
Figure 23:
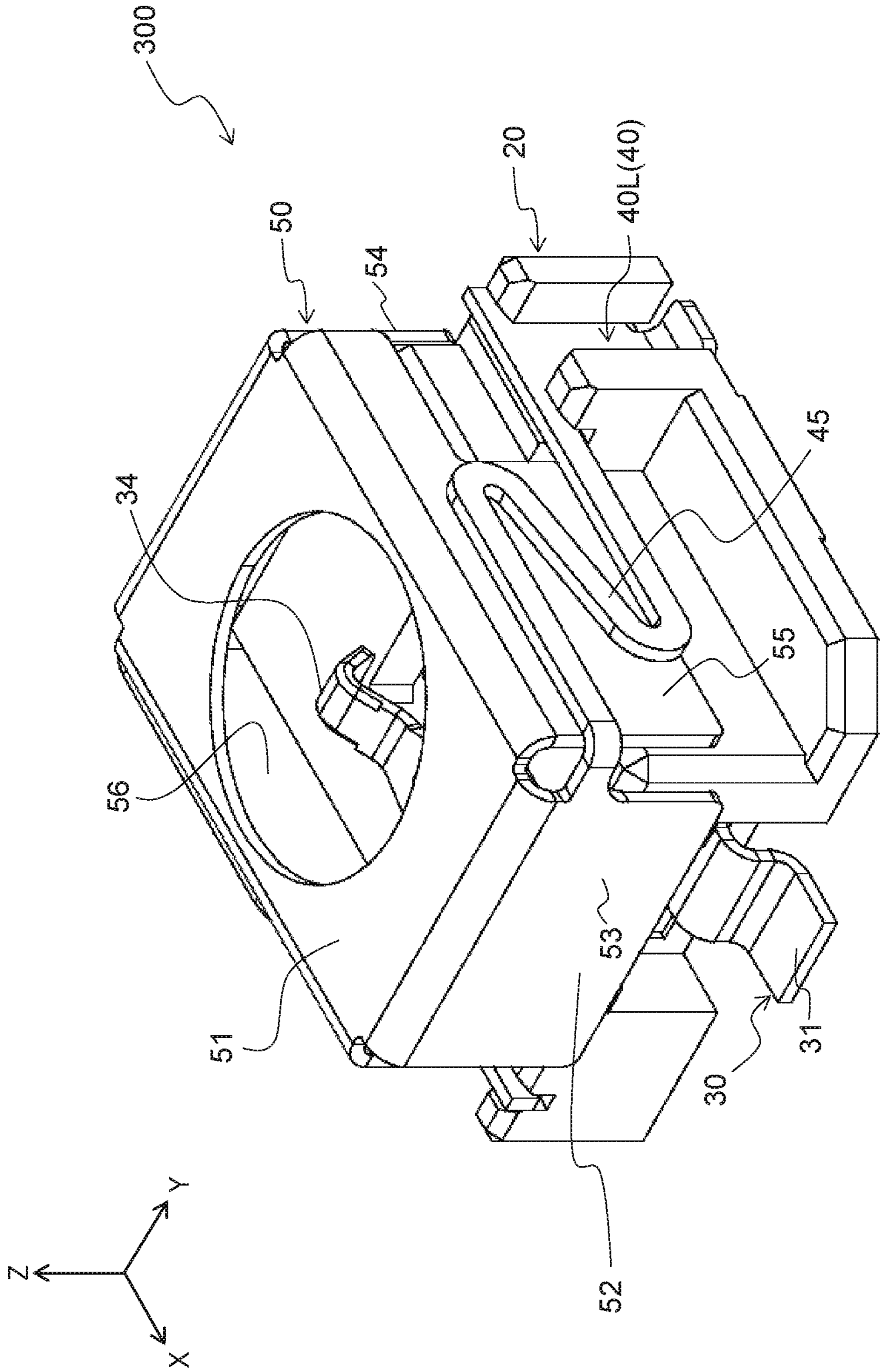
FIG. 23 is a perspective view of a connector according to a third exemplary embodiment.

FIG. 22 and FIG. 23 illustrate a connector 300 according to a third exemplary embodiment.

The connector 300 includes a housing 20, a signal terminal 30, and shield members 50. The shield members 40, 50 include two ground terminals 40L, 40R, and the shell 50, integrated together as a single body. The number of component is reduced due to the ground terminals 40 and the shell 50 being formed as a single body.

A resilient portion 45 (resilient support portion) of the left ground terminal 40L is connected to a front plate portion 53 of the shell 50, and a resilient portion 45 (resilient support portion) of the right ground terminal 40R is connected to a rear plate portion 54 of the shell 50 (omitted in the drawings). The left and right ground terminals 40L, 40R are formed so as to have 180° rotational symmetry to each other about an axis along the up-down direction.

The housing 20 includes the bottom wall 21 and a pair of terminal close-proximity walls 24, and does not include a pair of side walls 22. The left-right plate portions 55, 56 of the shell 50 are disposed in close proximity at the width direction outside of the pair of terminal close-proximity walls 24 of the housing 20. The resilient portions 45 of the ground terminals 40 are positioned at the outside of the side face portions 52 of the shell 50.

Fourth Exemplary Embodiment

Figure 24:
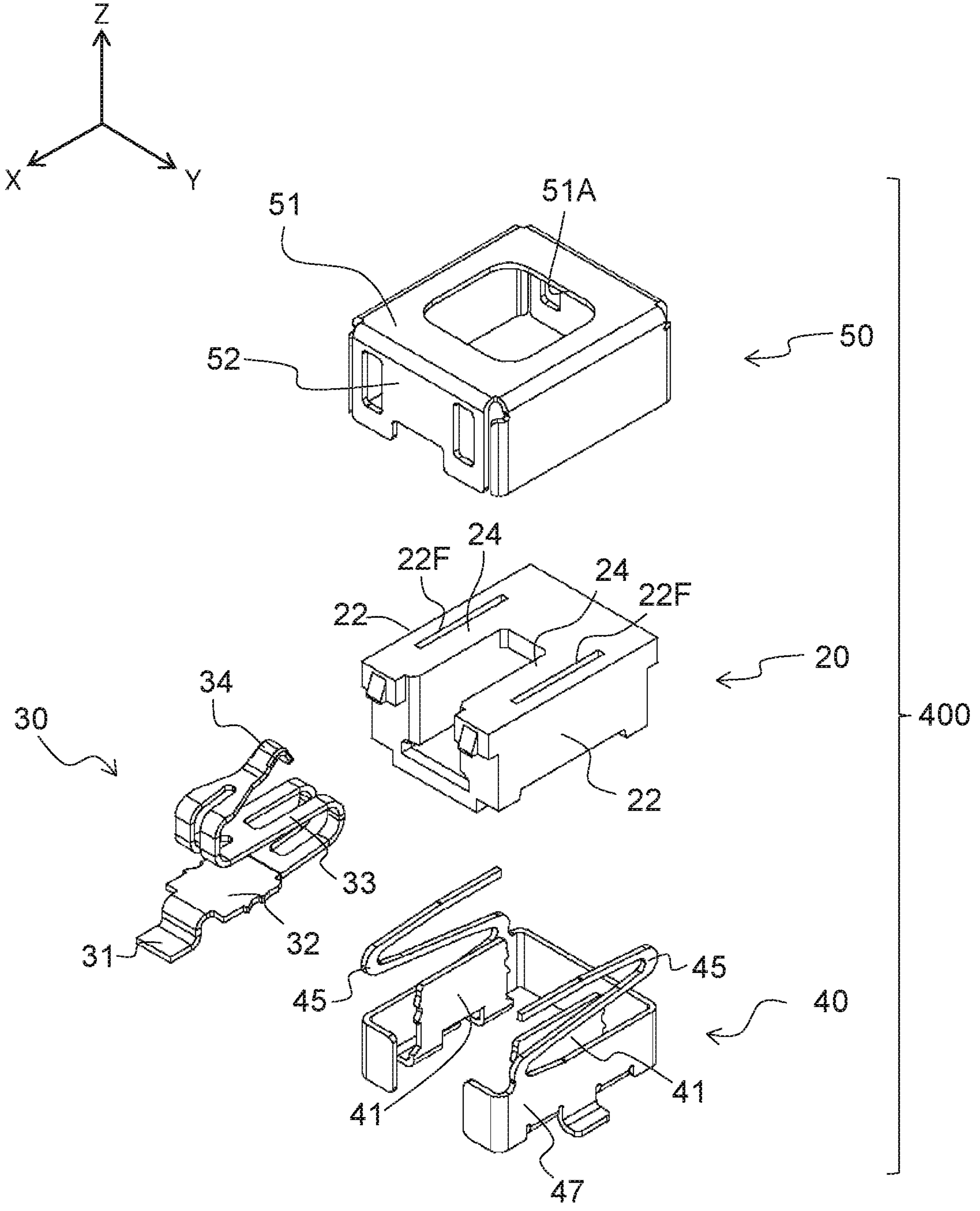
FIG. 24 is an exploded perspective view of a connector according to a fourth exemplary embodiment.
Figure 25:
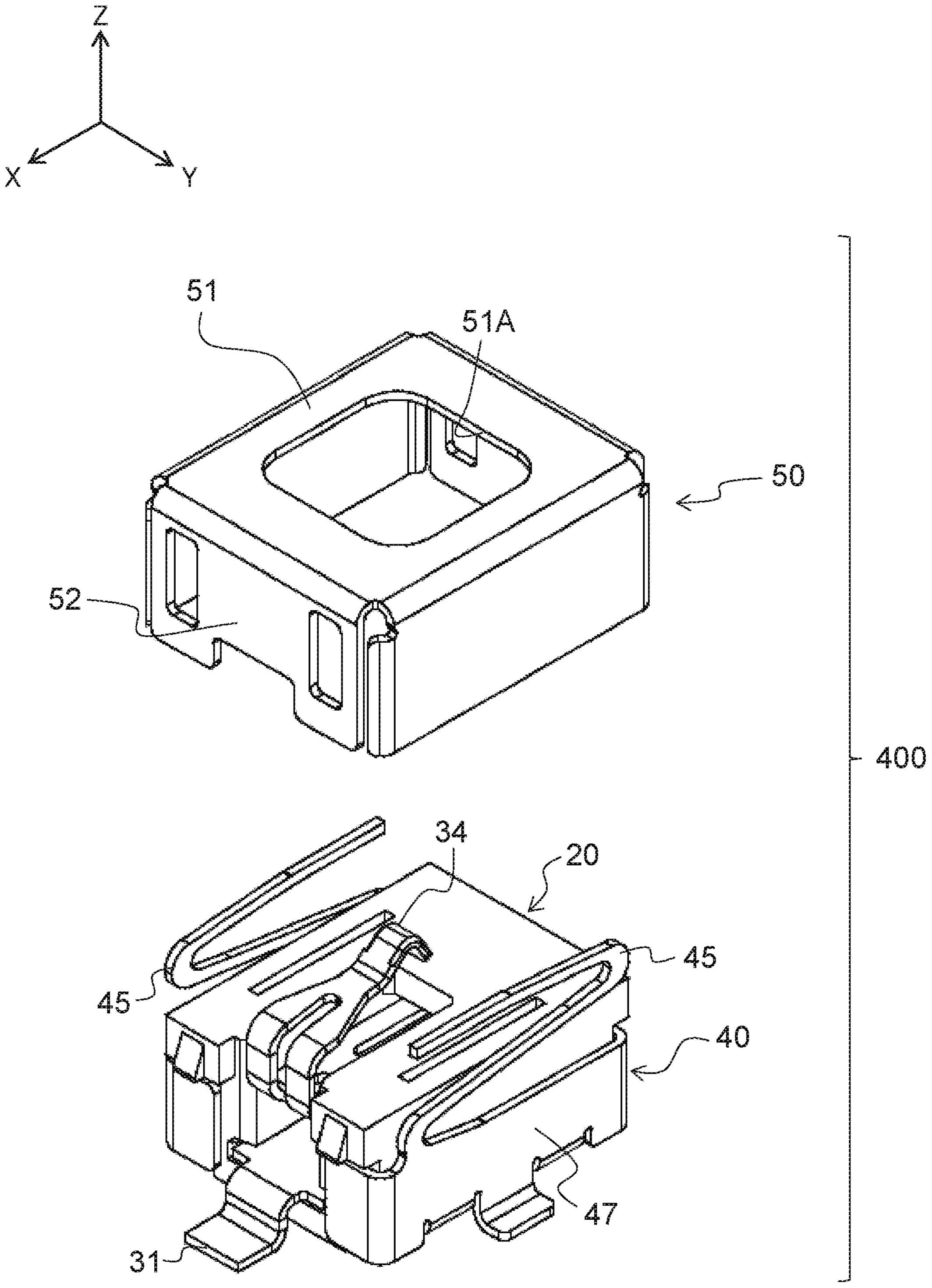
FIG. 25 is a perspective view of partway through assembling a connector according to the fourth exemplary embodiment.
Figure 26:
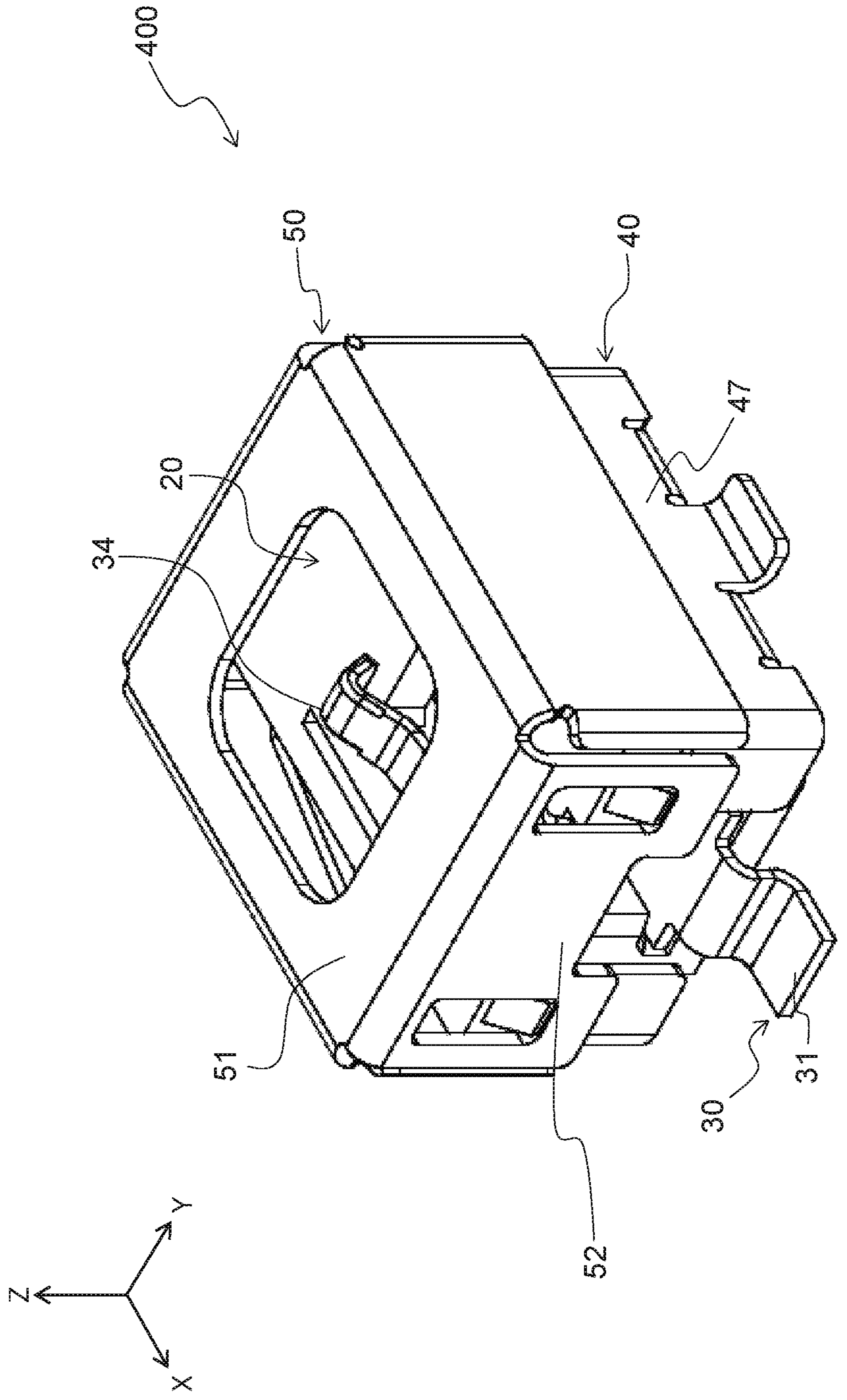
FIG. 26 is a perspective view of a connector according to the fourth exemplary embodiment.
Figure 27:
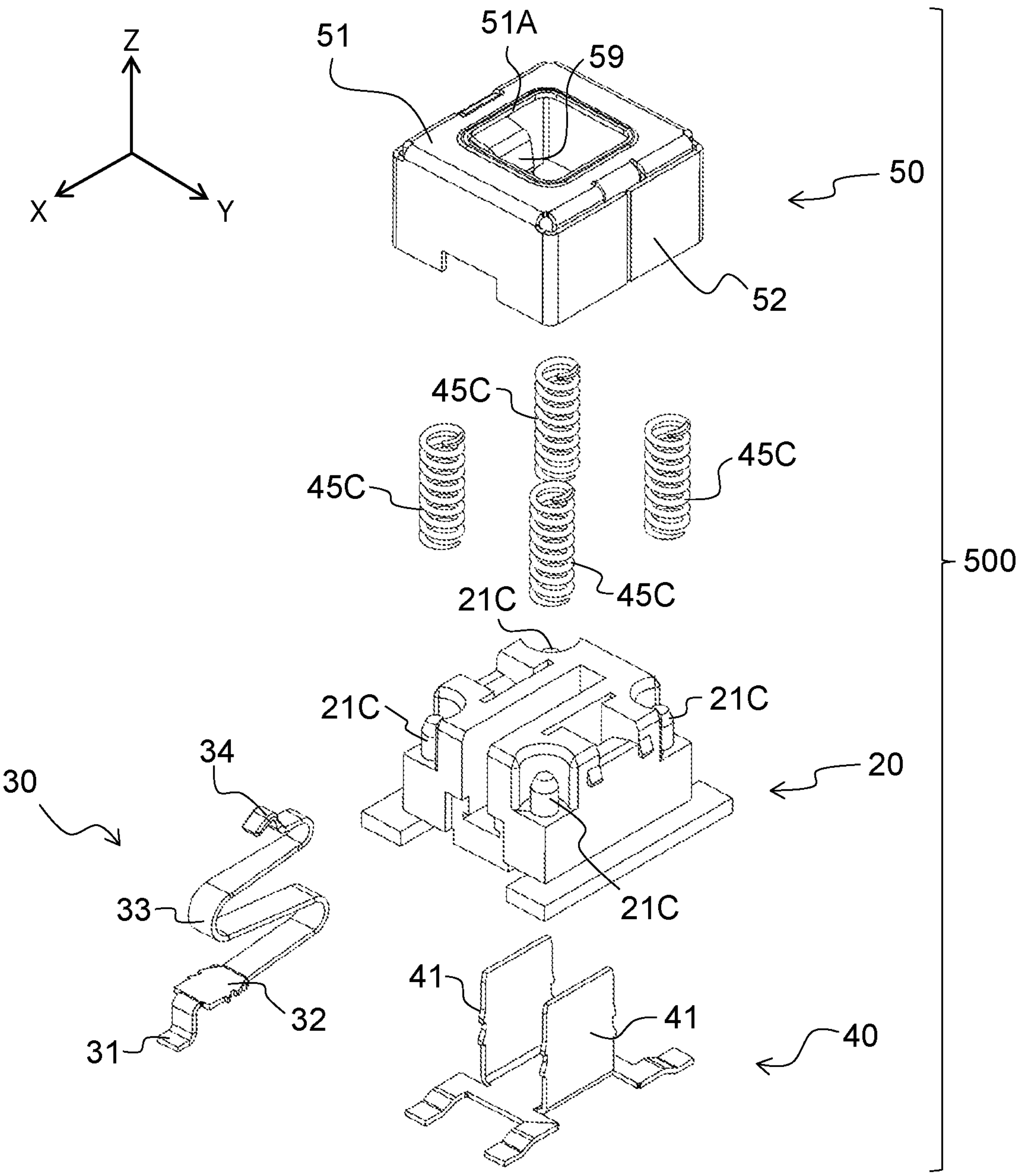
FIG. 27 is an exploded perspective view of a connector according to a fifth exemplary embodiment.
Figure 28:
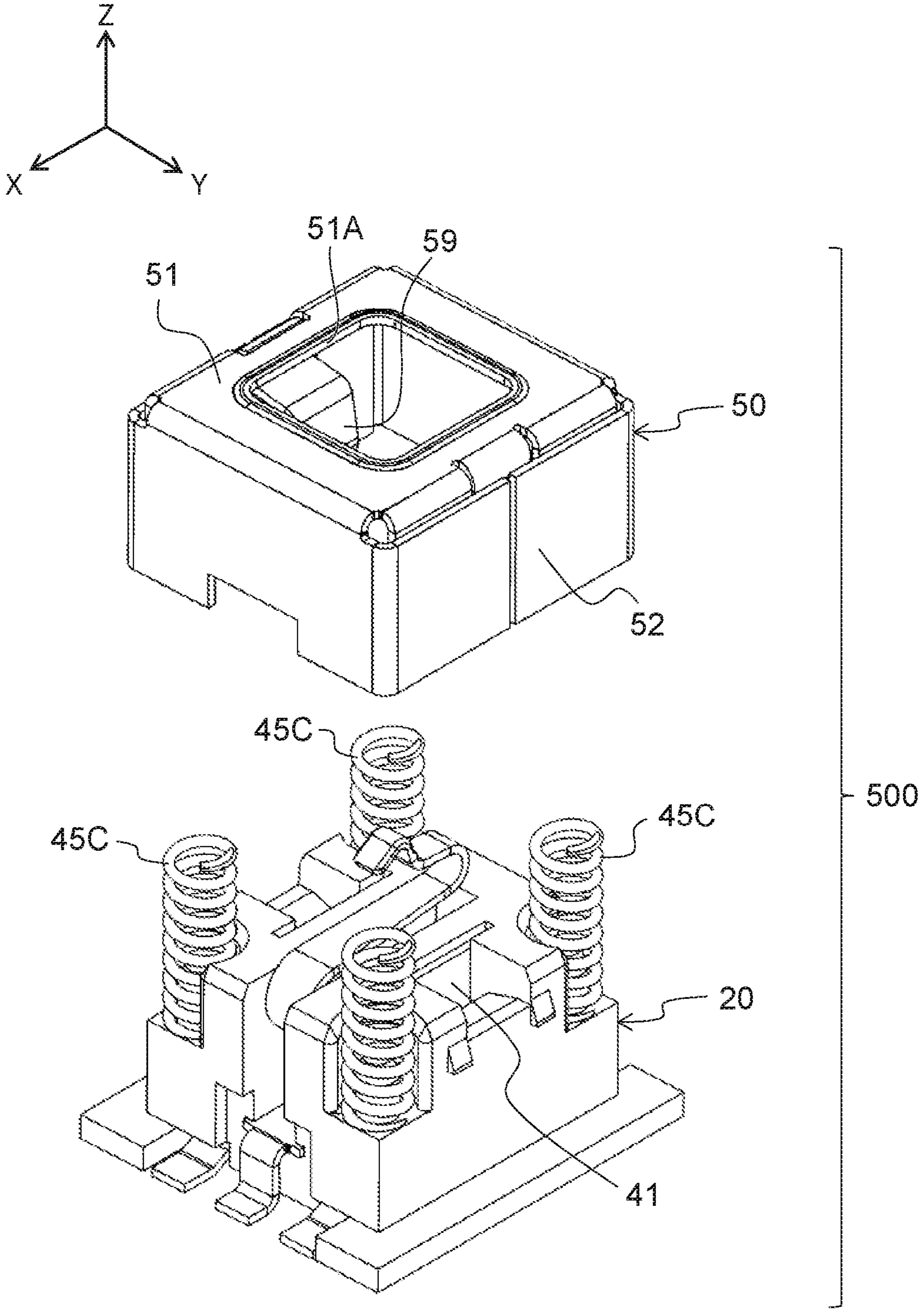
FIG. 28 is a perspective view of partway through assembling a connector according to the fifth exemplary embodiment.
Figure 29:
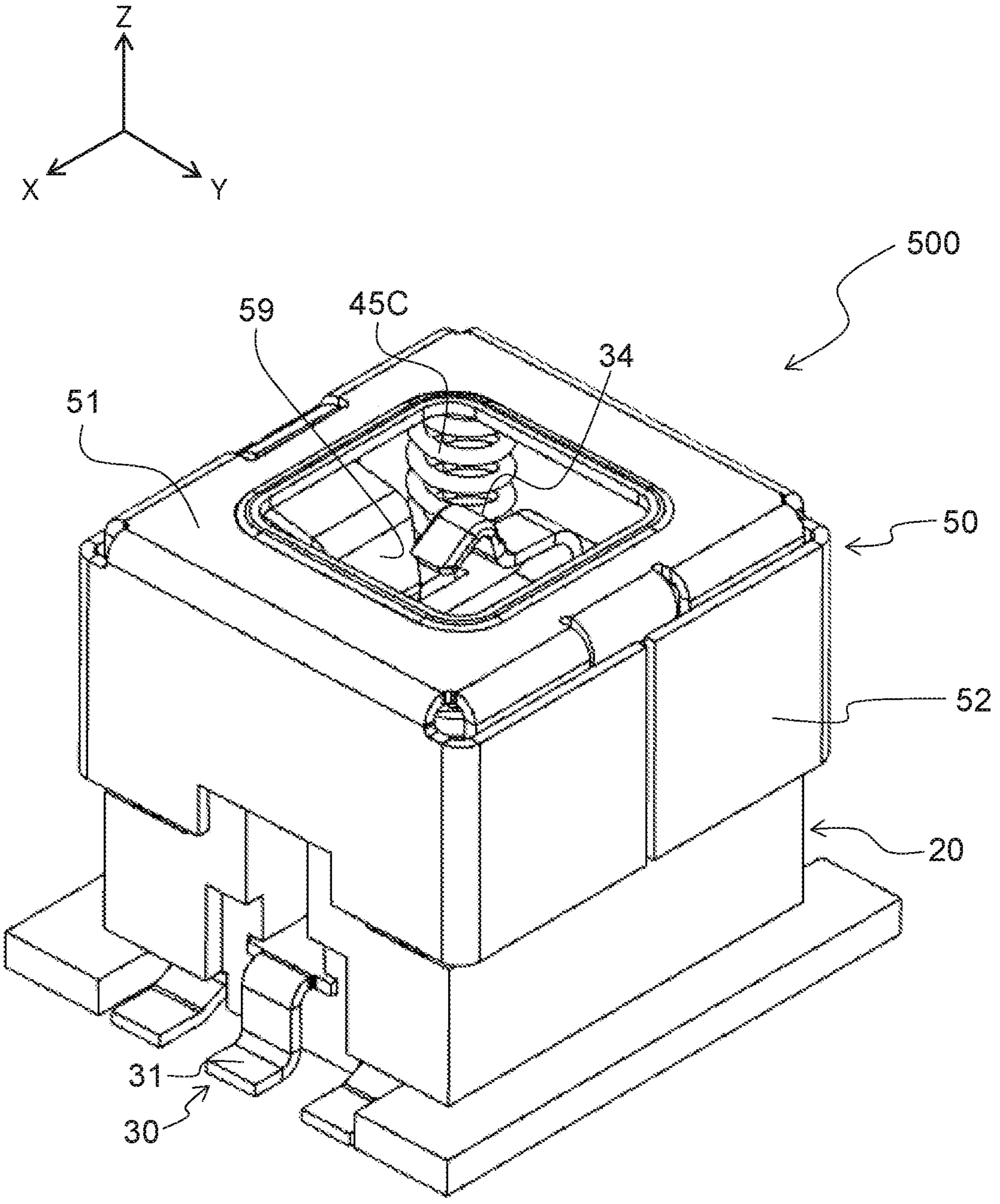
FIG. 29 is a perspective view of a connector according to the fifth exemplary embodiment.

FIG. 24 to FIG. 26 illustrate a connector 400 according to a fourth exemplary embodiment.

The connector 400 includes a housing 20, a signal terminal 30, a ground terminal 40, and a shell 50.

The ground terminal 40 includes a pair of first vertical plate portions 41. The first vertical plate portions 41 are press-fitted into the housing 20 from below, disposed at a width direction outside of the terminal close-proximity walls 24 of the housing 20, and function as assist plates. The housing 20 includes a pair of side walls 22, with a press-fitted-into hole 22F formed in each of the pair of side walls 22. Width direction inside portions of the press-fitted-into hole 22F of the side walls 22 function as terminal close-proximity walls 24.

The ground terminal 40 includes a surrounding portion 47 that surrounds the housing from directions in an XY plane. Part of a front side of the surrounding portion 47 is open, and part of the signal terminal 30 is disposed in this portion. The surrounding portion 47 of the ground terminal 40 shields a lower portion of the housing 20 that is not shielded by the side face portions 52 of the shell 50.

The housing 20 does not include guide portions 22B (see FIG. 8), however the left and right resilient portions 45 of the ground terminals 40 are shaped so as to have 180° rotational symmetry to each other about an axis along the up-down direction, so as to stabilize the orientation of the shell 50.

Fifth Exemplary Embodiment

FIG. 27 to FIG. 30 illustrate a connector 500 according to a fifth exemplary embodiment.

The connector 500 includes a housing 20, a signal terminal 30, a ground terminal 40, a shell 50, and four coil springs 45C.

The four coil springs 45C function as resilient support portions to resiliently support the shell 50 so as to be able to displace in the up-down direction. A lower end of each of the coil springs 45C is retained in coil retaining portions 21C formed at four locations corresponding to corner portions of the housing 20.

The ground terminal 40 includes a pair of first vertical plate portions 41 (assist plates). The ground terminal 40 is press-fitted into the housing 20 from below, and the pair of first vertical plate portions 41 are disposed at the width direction outside of a pair of terminal close-proximity walls 24 of the housing 20.

Figure 30:
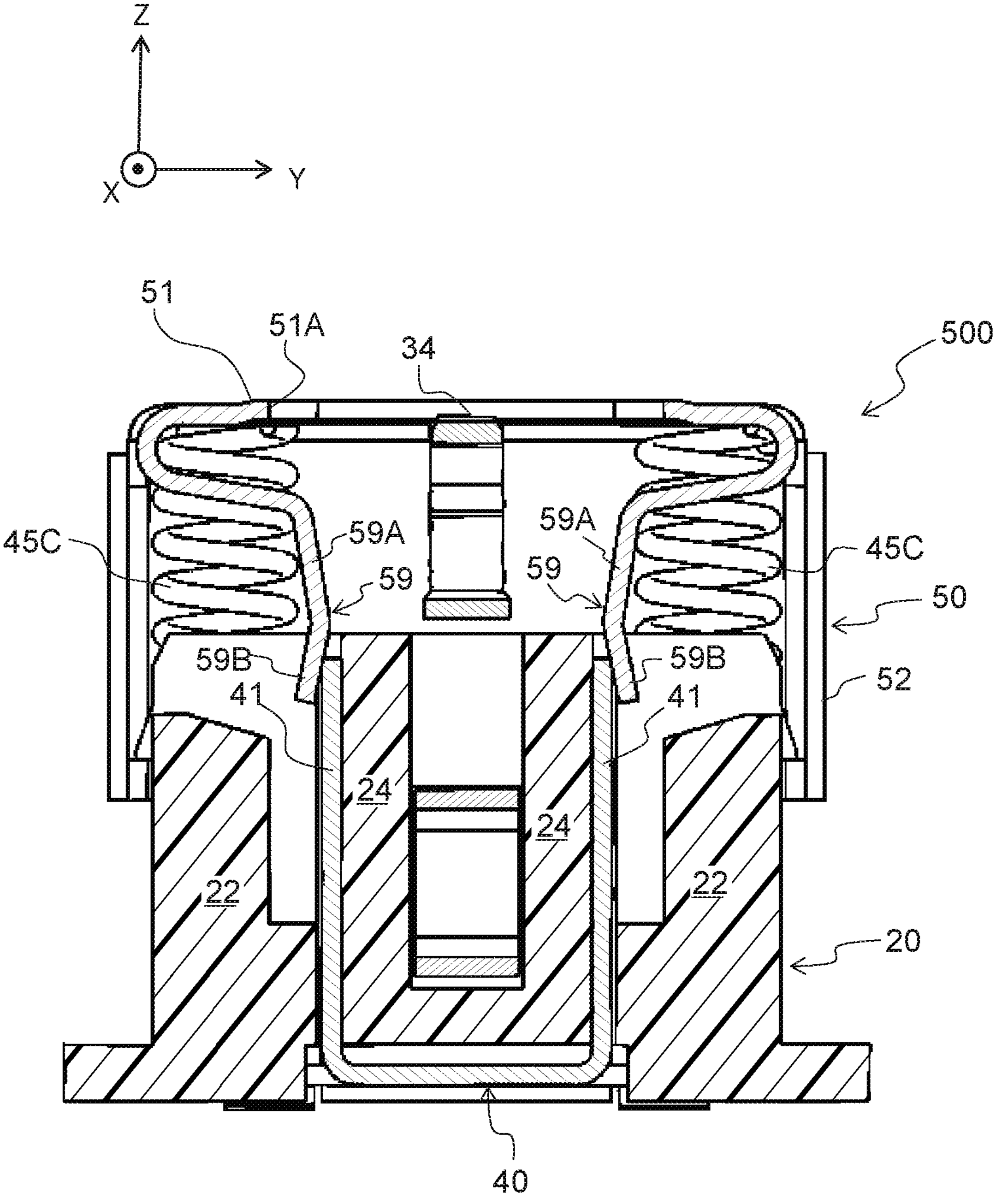
FIG. 30 is a cross-section of a connector according to the fifth exemplary embodiment.

As illustrated in FIG. 30, the connector 500 includes a pair of movable assist plates 59. The movable assist plates 59 are disposed in the width direction at substantially the same positions as the first vertical plate portions 41 (assist plates). The movable assist plates 59 are displaced in the up-down direction coupled to displacement of the shell 50 in the up-down direction. The movable assist plates 59 are formed as a single body together with a top face portion 51 and side face portions 52 etc. of the shell 50. The movable assist plates 59 are formed by fold-bending part of an outer edge of the top face portion 51 in a direction inclined downward and toward the width direction inside. The movable assist plates 59 are in a state of electrically contiguous contact with the first vertical plate portions 41.

The movable assist plates 59 include a main body portion 59A and a leading end portion 59B. The state illustrated in FIG. 30 is an initial state, and in the initial state the leading end portions 59B of the movable assist plates 59 contact the first vertical plate portions 41. In the initial state the main body portion 59A of the movable assist plates 59 are inclined toward the width direction inside on progression downward.

When the shell 50 is displaced downward from the initial state, the main body portions 59A of the movable assist plates 59 reach a state of contact with the first vertical plate portions 41. When in this state, an inclination of the main body portions 59A of the movable assist plates 59 is eliminated, and a state is achieved in which the main body portions 59A extend substantially parallel to the downward direction (omitted in the drawings). Moreover, when the shell 50 is displaced downward, the movable assist plates 59 enter between side walls 22 of the housing 20 and the first vertical plate portions 41 of the ground terminals 40.

The movable assist plates 59 become disposed at the width direction outside with respect to a portion of the signal terminal 30 that projects upward from the housing 20 (terminal close-proximity walls 24). This means that impedance is adjusted even for the portion of the signal terminal 30 that projects upward from the housing 20, raising the high speed transmission performance Namely, a structure is achieved such that the assist plates 41 (first vertical plate portions) are extended upward by the movable assist plates 59. This thereby enables an effect to be imparted by the movable assist plates 59 to portions of the signal terminal 30 (portions that project to the upper side from the terminal close-proximity walls 24 of the housing 20) that are difficult to impart an effect to by using the assist plates 41, the impedance is adjusted, and the high speed transmission performance is raised.

Note that a plate width (X direction dimension) of the movable assist plates 59 is preferably greater than an X direction dimension of a portion formed to a leading end portion of the signal terminal 30 by being fold-bended so as to project upward (a portion corresponding to the contact portion 34). Preferably an X direction range where the movable assist plates 59 are present is a range that encompass an X direction range of the presence of the portion formed to the leading end portion of the signal terminal 30 by being fold-bended so as to project upward.

Note that in the structure illustrated in FIG. 30, a Y direction distance between the signal terminal 30 and the movable assist plates 59 is large at a height position corresponding to the contact portion 34 of the signal terminal 30. However, the movable assist plates 59 may be configured such that a Y direction distance between the signal terminal 30 and the movable assist plates 59 is a similar distance at a height position corresponding to the contact portion 34 of the signal terminal 30 to a distance at a height position where the movable assist plates 59 and the assist plates 41 are in contact with each other.

Sixth Exemplary Embodiment

FIG. 31 to FIG. 35 illustrate a connector 600 according to a sixth exemplary embodiment.

The connector 600 includes a housing 20, a signal terminal 30, a ground terminal 40, a shell 50, and two spring fittings 140 serving as "resilient support portions".

Figure 36:
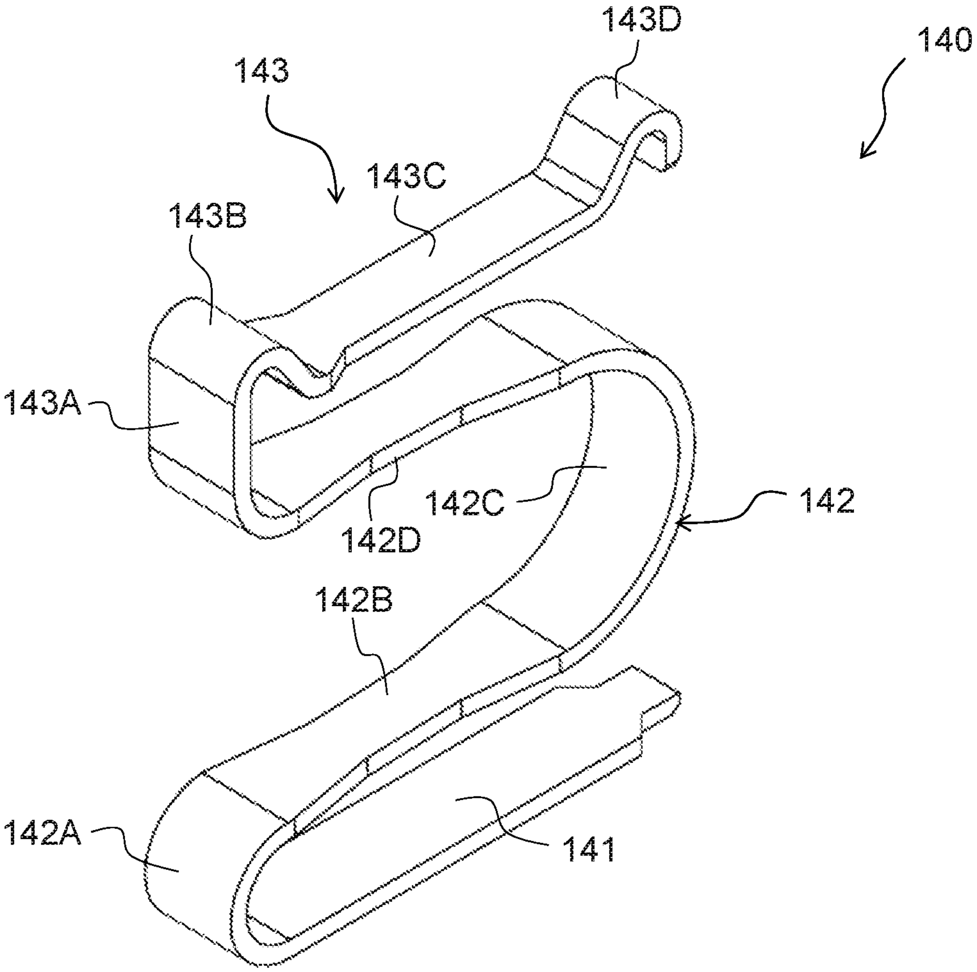
FIG. 36 is a perspective view of a spring fitting provided to a connector according to the sixth exemplary embodiment.

The two spring fittings 140 are formed with the same shape as each other. As illustrated in FIG. 36, each of the spring fittings 140 includes a base portion 141, a spring portion 142, and a support portion 143, in this order.

The support portion 143 is a portion that supports the shell 50. The support portion 143 includes an upward extension portion 143A extending upward from the spring portion 142, a first support portion 143B, a connection portion 143C, and a second support portion 143D. The support portion 143 supports the shell 50 at two points distanced from each other in a front-rear direction, i.e. at the first support portion 143B and the second support portion 143D. There are two of the spring fittings 140 disposed such that the shell 50 is supported at a total of four points.

Figure 35:
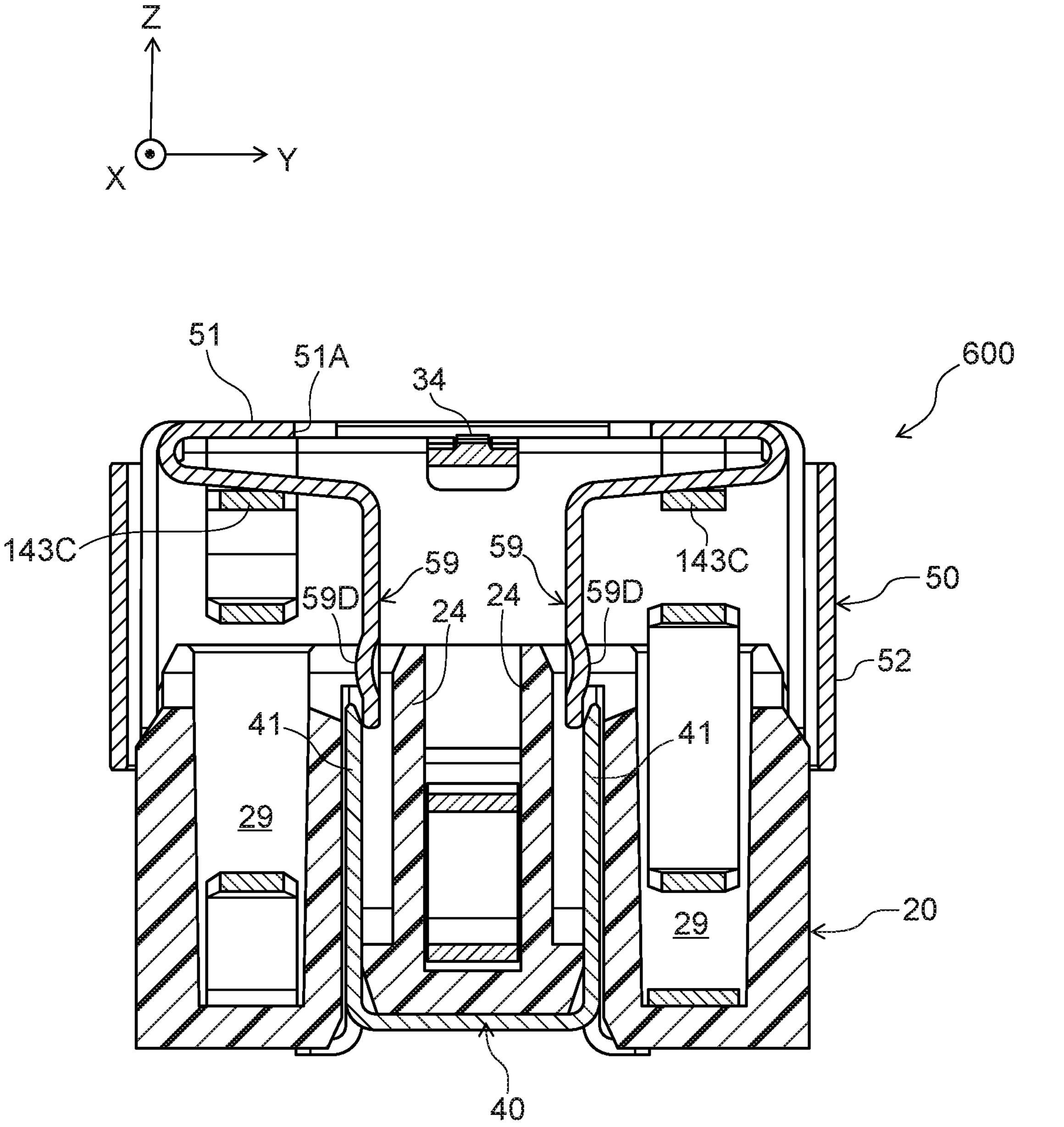
FIG. 35 is a cross-section of a connector according to the sixth exemplary embodiment.

The first support portion 143B and the second support portion 143D are both bent so as to be convex in the upward direction. The connection portion 143C connects the first support portion 143B and the second support portion 143D together at a position at a lower side of apex portions of the first support portion 143B and the second support portion 143D. The connection portion 143C is thereby configured so as to avoid part (an upper portion) of the movable assist plate 59 of the shell 50 (see FIG. 35). Note that as illustrated in FIG. 35, in the present exemplary embodiment the connection portion 143C contacts part (upper portion) of the movable assist plates 59 from below, and so this facilitates holding the orientation of the shell 50 in a correct orientation. However, the connection portion 143C may be configured so as not to contact part (upper portion) of each of the movable assist plates 59.

The spring portion 142 includes a first bent portion 142A, a first extension portion 142B, a second bent portion 142C, and a second extension portion 142D. The first bent portion 142A converts the extension direction of the spring portion 142 from a front-rear direction one side to a front-rear direction other side, and the second bent portion 142C converts the extension direction of the spring portion 142 from the front-rear direction other side to the front-rear direction one side. Namely, the spring portion 142 includes two fold-back portions where the extension direction of the spring portion 142 is converted in the front-rear direction. The orientation of the support portion 143 is stable due to there being two of the fold-back portions. The second bent portion 142C has a greater radius of curvature of bend than that of the first bent portion 142A.

Figure 31:
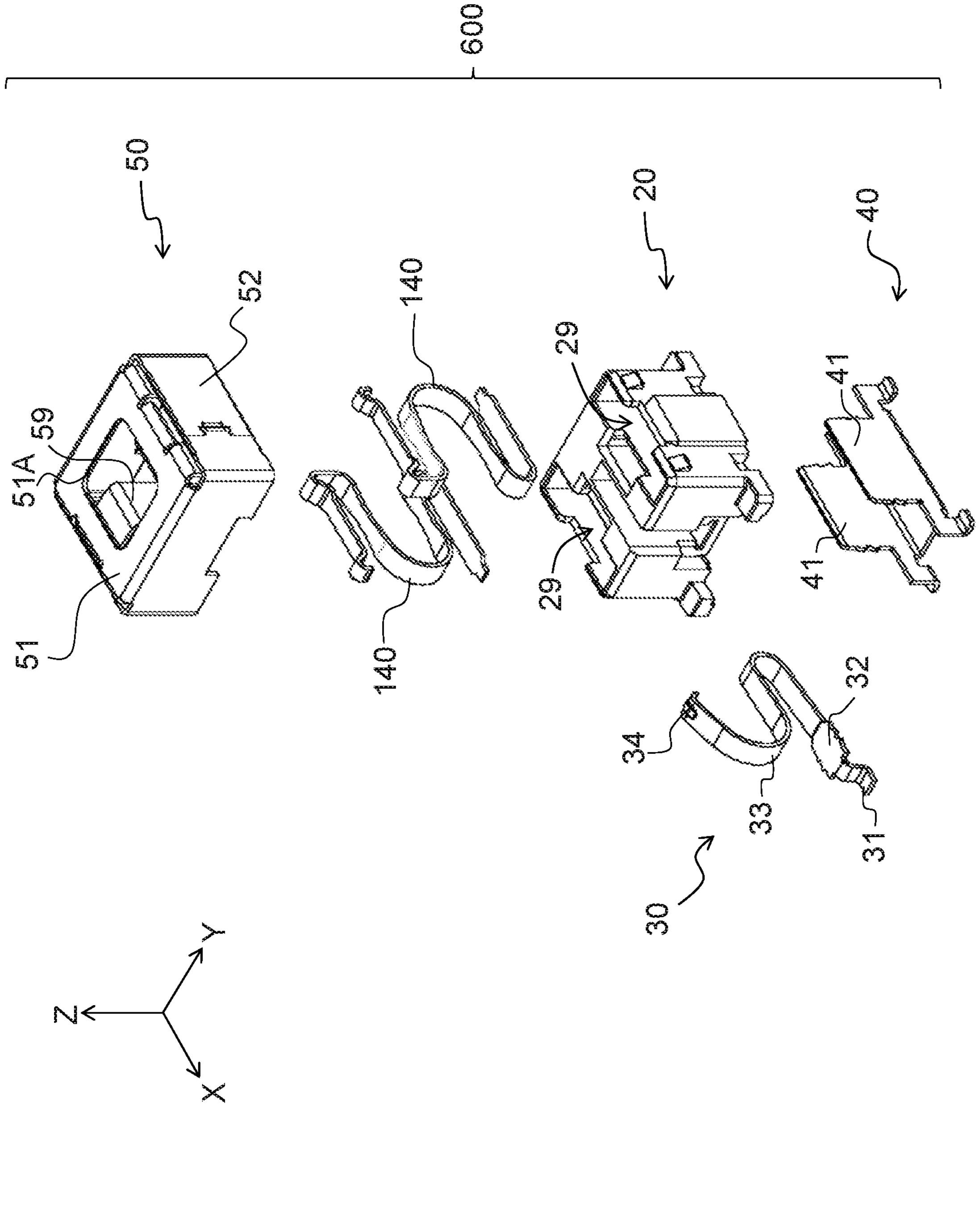
FIG. 31 is an exploded perspective view of a connector according to a sixth exemplary embodiment.
Figure 32:
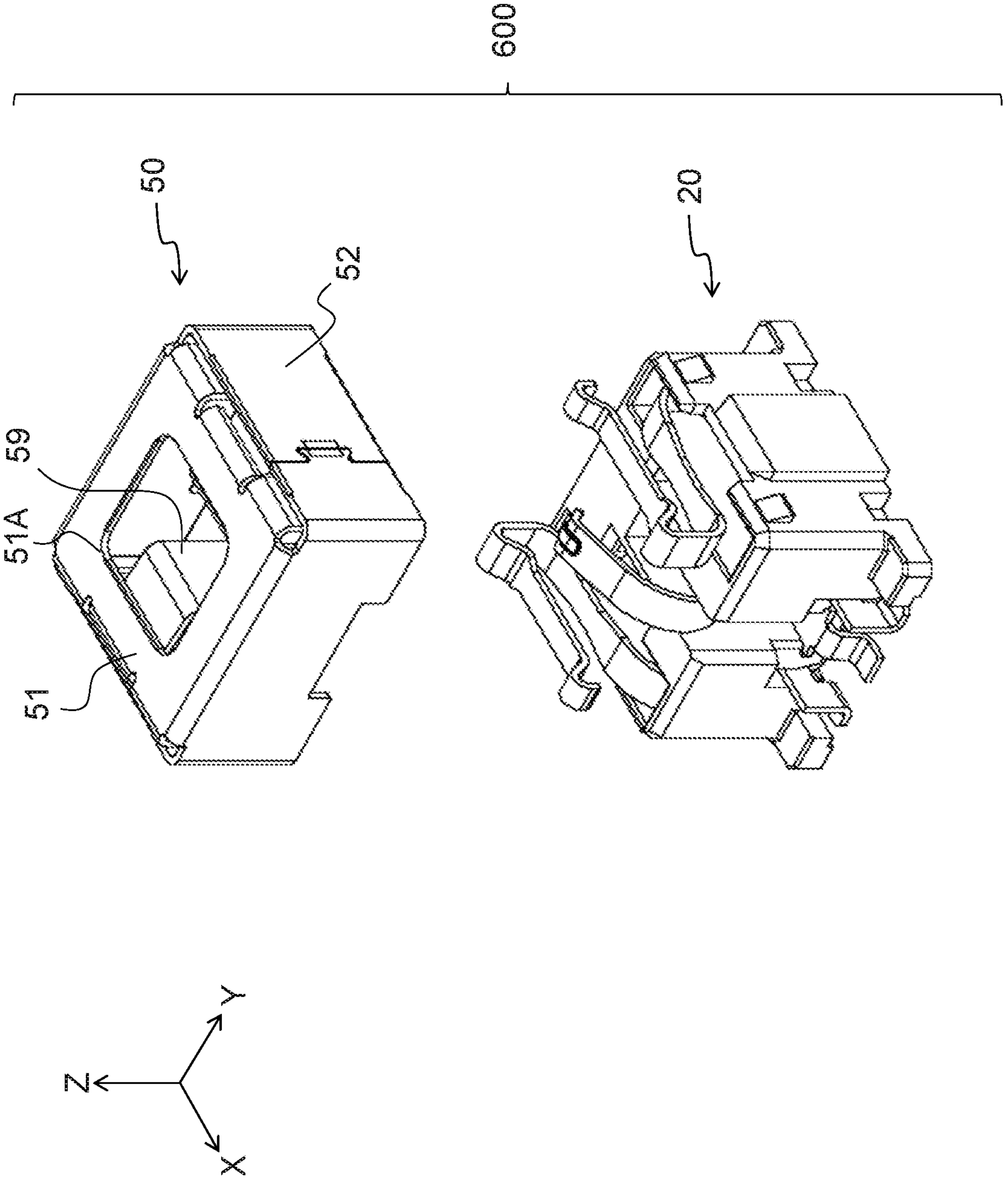
FIG. 32 is a perspective view of partway through assembling a connector according to the sixth exemplary embodiment.
Figure 33:
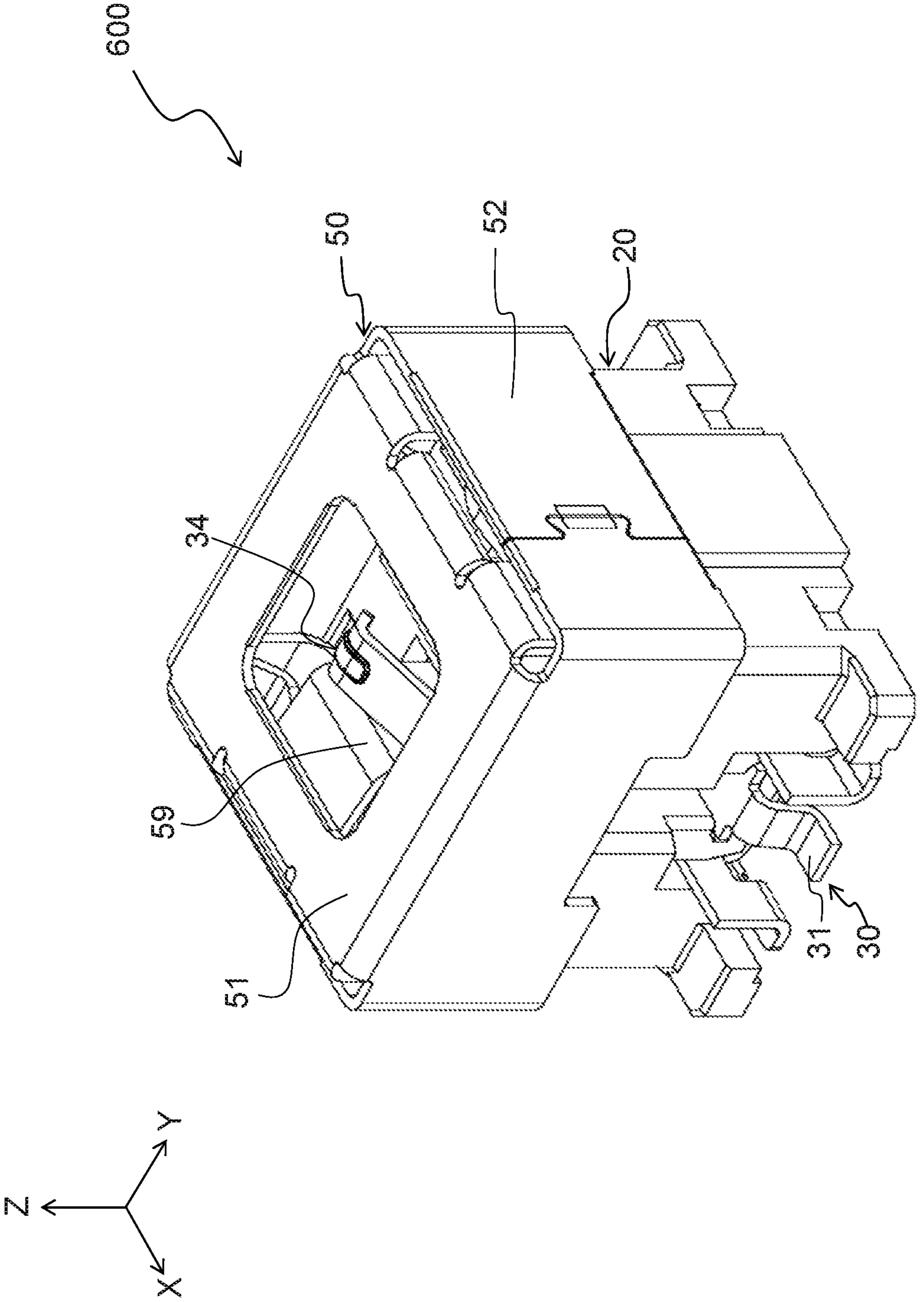
FIG. 33 is a perspective view of a connector according to the sixth exemplary embodiment.

As illustrated in FIG. 31, two spring placement holes 29 are formed in the housing 20 for placing the two spring fittings 140 into. The spring placement holes 29 are open upward. The spring fittings 140 have a structure that is not press-fitted into the housing 20, but instead is simply placed therein, and so this facilitates assembly.

The two spring fittings 140 are disposed in orientations that are reversed from each other in the front-rear direction. This means that the shell 50 resiliently supported by the two spring fittings 140 is prevented from tilting toward one side from out of the front side or the rear side.

Figure 34:
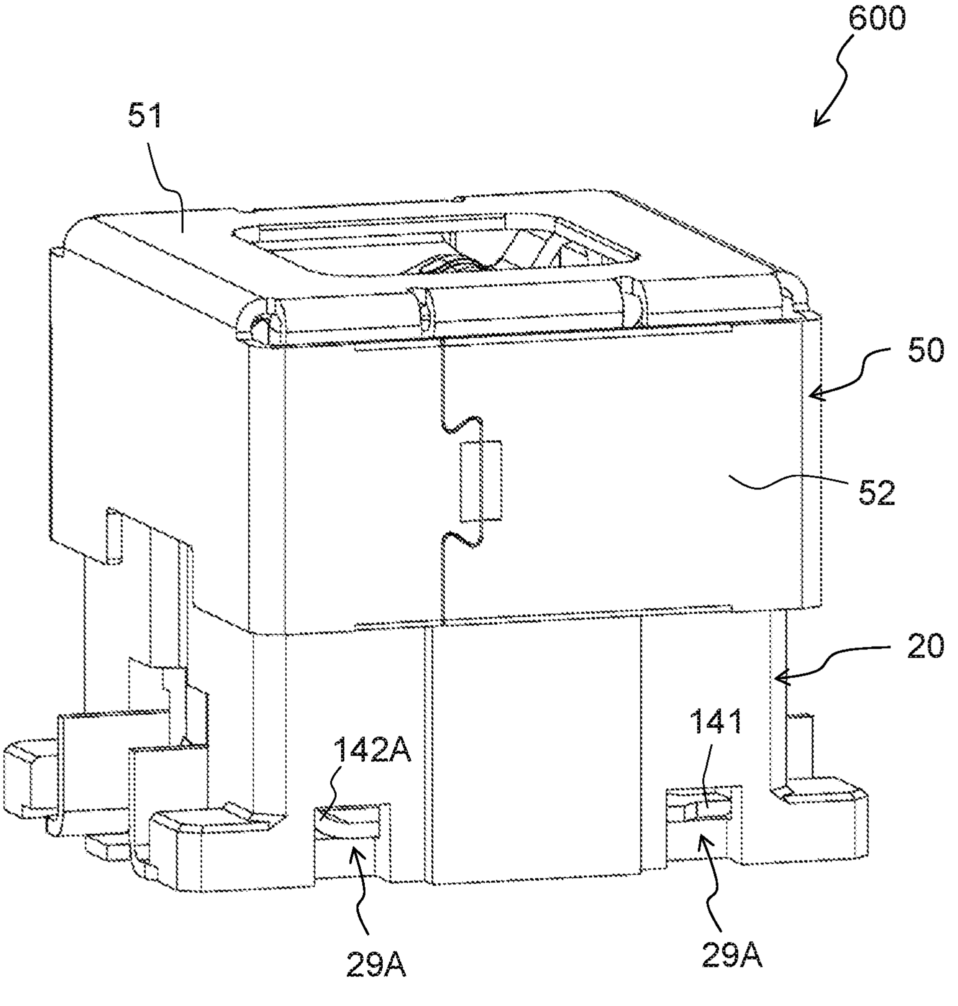
FIG. 34 is a perspective view of a connector according to the sixth exemplary embodiment, as viewed from a different angle.

As illustrated in FIG. 34, there are check windows 29A formed in the housing 20 for checking that the spring fittings 140 are correctly placed in the spring placement holes 29. The check windows 29A are formed in two locations, at the front and rear with respect to a single spring placement hole 29. The check windows 29A are configured so as to enable checking one end portion of the base portion 141 of the spring fittings 140 and the other end portion (the first bent portion 142A side) thereof from the width direction outside of the housing 20.

As illustrated in FIG. 31, the ground terminal 40 includes the pair of first vertical plate portions 41 (assist plates). By press-fitting the ground terminal 40 into the housing 20 from below, the pair of first vertical plate portions 41 are disposed at the width direction outside of the pair of terminal close-proximity walls 24 of the housing 20 (see FIG. 35).

As illustrated in FIG. 35, the connector 600 includes the pair of movable assist plates 59. The movable assist plates 59 displace in the up-down direction coupled to displacement of the shell 50 in the up-down direction. The movable assist plates 59 are formed as a single body together with a top face portion 51 and side face portions 52 etc. of the shell 50. The movable assist plates 59 are formed by fold-bending part of an outer edge of the top face portion 51 in a direction inclined downward and toward the width direction inside.

When the shell 50 is displaced downward from the initial state illustrated in FIG. 35, bulge portions 59D of the movable assist plates 59 reach a state of contact with the first vertical plate portions 41 from the width direction inside. The movable assist plates 59 are inserted into gaps between the terminal close-proximity walls 24 and the first vertical plate portions 41. This thereby enables each member to be placed efficiently, without there being a need to form gaps at the width direction outside of the first vertical plate portions 41 in the housing 20 formed with the spring placement holes 29. As a result this enables a more compact connector 600 to be realized.

The movable assist plates 59 are disposed at the width direction outside with respect to the portion of the signal terminal 30 that projects upward from the housing 20 (the terminal close-proximity walls 24). The impedance is accordingly adjusted even at the portion of the signal terminal 30 that projects upward from the housing 20, raising the high speed transmission performance.

Supplementary Explanation of Above Exemplary Embodiments

Note that although in the above exemplary embodiments the connection target is the rear member 80 of the camera module 1, the connection target of the present disclosure is not limited thereto. For example, the connection target may be another board disposed in the plus Z direction with respect to the connector.

Moreover, although in the above exemplary embodiments a direction in which the terminal contact portion 34 contacts a connection target 80 is the Z direction and the terminal contact portion 34 is able to displace in the Z direction, the terminal contact portion of the present disclosure is not limited thereto. For example, the terminal contact portion may make contact so as to sandwich the connection target from the X direction or the Y direction.

Although in the above exemplary embodiment the ground terminal 40 includes the connection portions 44, 42A for connecting to the board 71, the shield member and ground terminals of the present disclosure are not limited thereto.

Although in the above exemplary embodiments the inner conductor contact portion 83A and the outer conductor contact portion 84A are both flat surfaces having normal directions toward the Z direction other side, the inner conductor contact portion and the outer conductor contact portion of the present disclosure are not limited thereto, and may be curved surfaces.

Although in the above exemplary embodiments retaining of the housing 20 with respect to the signal terminal 30 is realized by the retained portion 32 of the signal terminal 30 being press-fitted into the housing 20, the present disclosure is not limited thereto. A retained portion of a signal terminal may be retained in a housing by the signal terminal being insert molded together with the housing.

Although in the above exemplary embodiments the shell 50 of the connector 100 is in a so-called pre-loaded state when in the initial state, the present disclosure is not limited thereto, and the shell 50 may be in a non-pre-loaded state in the initial state.

An example has been described in which the side face portions 52 of the shell 50 in the above first exemplary embodiment are, as illustrated in FIG. 11, configured from the plural plate portions 53, 54, 55, 56, and parts of mutually adjacent plate portions from out of the plural plate portions 53, 54, 55, 56 are overlapped with each other, such that the signal terminal 30 is entirely surrounded from all directions (360°) in directions orthogonal to the Z direction. However, the side face portion of the present disclosure is not limited thereto, and as in the second exemplary embodiment to the fifth exemplary embodiment, the side portions may include a portion not surrounded in some directions from out of all directions (360°). "A side face portion that surrounds the signal terminal from a direction orthogonal to the Z direction" in the present disclosure corresponds to embodiments, such as the second exemplary embodiment to the fifth exemplary embodiment, in which the side face portion is formed in four directions of approximately the ±X directions and the ±Y directions.

In other words, the "side face portion" of the present disclosure is not limited to one that surrounds the signal terminal from directions orthogonal to the Z direction, and may be a side portion that covers the signal terminal from any direction orthogonal to the Z direction. For example, the two front-rear plate portions 53, 54 of the shell 50 in the first exemplary embodiment may be omitted, such that the signal terminal 30 is not covered from the front side or the rear side but is covered by the side face portions 52 only from the right side and the left side with respect to the signal terminal 30.

Although in the above exemplary embodiments the side face portions 52 of the shell are configured from the plural plate portions 53, 54, 55, 56 respectively connected to the top face portion 51 through bent portions, the side face portion of the present disclosure is not limited thereto. For example, the side face portion may be configured from a single plate portion connected to a top face portion through a bent portion. Namely, in the shell 50 of the first exemplary embodiment (FIG. 11), the three plate portions 54, 55, 56 may be omitted from out of the four plate portions 53, 54, 55, 56, and the size of the single plate portion 53 enlarged such that the signal terminal 30 is surrounded from directions orthogonal to the Z direction by the plate portion 53 alone. Furthermore, in such cases an area in vicinity of a plate end at one side of this single plate portion may be overlapped with an area in vicinity of a plate end at the other side thereof, such that a gap is suppressed from being formed between the one side plate end and the other side plate end.

EXPLANATION OF THE REFERENCE NUMERALS

1 camera module
20 housing
21 bottom wall
23 rear wall
24 terminal close-proximity walls
30 signal terminal
33E, 34 leading-end-side extension portion
34 contact portion (terminal contact portion, first connector contact portion)
40 ground terminal
40, 50 shield member
41 first vertical plate portion (assist plate)
45, 46 resilient support portion
46 shell contact portion
45C coil spring (resilient support portion)
46 contact portion (leading-end-side extension portion)
50 shell
51 top face portion (shield contact portion, second connector contact portion)
51A opening
52 side face portion
53, 54, 55, 56 plural plate portions
56D spring tab (resilient support portion)
71 board (attachment target)
80 rear member (connection target)
82 coaxial connector section
83 central conductor portion (inner conductor portion)
83A central conductor contact portion (inner conductor contact portion, first contact portion)
84 outer conductor portion
84A outer conductor contact portion (second contact portion)
140 spring fitting 140 (resilient support portion)
100 connector
200 connector
300 connector
400 connector
500 connector
600 connector

The invention claimed is:

1. A connector comprising:
a signal terminal as a single body including a connection portion configured for connection to an attachment target and a terminal contact portion configured to make electrically conductive contact with a first contact portion of a connection target for connection from a Z direction one side;
a housing that retains the signal terminal; and
a shell that surrounds at least part of the signal terminal, wherein in the connector:
the shell includes a shield contact portion configured to make electrically conductive contact with a second contact portion of the connection target; and
the shell is displaceable in a Z direction.

2. The connector of claim 1, wherein:
the shell includes a top face portion positioned at the Z direction one side of the housing; and
an opening is formed at a center of the top face portion so as to expose the terminal contact portion.

3. The connector of claim 1, wherein the shell includes a side face portion that surrounds the signal terminal from a direction orthogonal to the Z direction.

4. The connector of claim 1, wherein the connector includes a resilient support portion that resiliently supports the shell so that the shell is displaceable in the Z direction.

5. The connector of claim 1, wherein:
the connector includes a ground terminal configured to make electrically conductive connection between the attachment target to which the connector is attached and the shell.

6. The connector of claim 5, wherein:
the shell and the ground terminal are separate;
the ground terminal includes a resilient support portion that resiliently supports the shell so that the shell is displaceable in the Z direction; and
the resilient support portion includes a shell contact portion that electrically connects the ground terminal and the shell together by making electrically conductive contact with the shell.

7. The connector of claim 5, wherein:
the shell and the ground terminal are separate;
the shell is formed as a single body with the resilient support portion to resiliently support the shell so that the shell is displaceable in the Z direction by contacting the housing; and
the ground terminal includes a shell contact portion that makes electrically conductive contact with the shell.

8. The connector of claim 1, wherein:
a direction in which the shield contact portion contacts the second contact portion of the connection target, and a direction in which the terminal contact portion contacts the first contact portion of the connection target, are both the Z direction.

9. The connector of claim 1, wherein, in an initial state, the shield contact portion is positioned further toward the Z direction one side than the terminal contact portion.

10. A connector comprising:
a signal terminal including a terminal contact portion configured to make electrically conductive contact with a first contact portion of a connection target for connection from a Z direction one side;
a housing that retains the signal terminal; and
a shell that surrounds at least part of the signal terminal, wherein in the connector:
the shell includes a shield contact portion configured to make electrically conductive contact with a second contact portion of the connection target; and
the shell is displaceable in a Z direction, wherein:
the shell includes a side face portion that surrounds the signal terminal from a direction orthogonal to the Z direction;

the side face portion is shaped to surround the signal terminal from the direction orthogonal to the Z direction by performing bend processing on a plate material; and a portion is formed where the plate material overlaps with itself such that a gap does not arise in a shape surrounding the signal terminal from the direction orthogonal to the Z direction.

11. A connector comprising:

a signal terminal including a terminal contact portion configured to make electrically conductive contact with a first contact portion of a connection target for connection from a Z direction one side;

a housing that retains the signal terminal; and a shell that surrounds at least part of the signal terminal, wherein in the connector:

the shell includes a shield contact portion configured to make electrically conductive contact with a second contact portion of the connection target; and the shell is displaceable in a Z direction, wherein:

the shell includes a top face portion disposed at the Z direction one side of the housing, and a side face portion that surrounds the signal terminal from a direction orthogonal to the Z direction further toward a Z direction other side than the top face portion;

an opening is formed at a center of the top face portion so as to expose the terminal contact portion;

the side face portion is configured from a plurality of plate portions each connected to the top face portion via a bent portion; and parts of adjacent plate portions from among the plurality of plate portions overlap with each other.

12. A connector comprising:

a signal terminal including a terminal contact portion configured to make electrically conductive contact with a first contact portion of a connection target for connection from a Z direction one side;

a housing that retains the signal terminal; and a shell that surrounds at least part of the signal terminal, wherein in the connector:

the shell includes a shield contact portion configured to make electrically conductive contact with a second contact portion of the connection target; and the shell is displaceable in a Z direction, wherein:

the housing includes a pair of terminal close-proximity walls opposing each other in a Y direction;

the signal terminal is disposed between the pair of terminal close-proximity walls; and the connector includes a pair of assist plates having plate thickness directions facing in the Y direction, and disposed at a Y direction outer side with respect to the pair of terminal close-proximity walls.

13. The connector of claim 12, wherein:

the signal terminal includes a retained portion that is retained between the pair of terminal close-proximity walls;

a portion of the pair of terminal close-proximity walls where the retained portion is retained includes a face at the Y direction outer side which is enlarged toward the Y direction outer side compared to other portions; and the pair of assist plates are shaped to run along Y direction outer side faces of the pair of terminal close-proximity walls.

14. The connector of claim 12, further comprising a pair of movable assist plates having plate thickness directions facing in the Y direction and displacing in the Z direction together with displacement of the shell in the Z direction, wherein:

a portion of the signal terminal that projects out from the housing toward the Z direction one side is positioned between the pair of movable assist plates.

15. A connector comprising:

a signal terminal including a terminal contact portion configured to make electrically conductive contact with a first contact portion of a connection target for connection from a Z direction one side;

a housing that retains the signal terminal; and a shell that surrounds at least part of the signal terminal, wherein in the connector:

the shell includes a shield contact portion configured to make electrically conductive contact with a second contact portion of the connection target; and the shell is displaceable in a Z direction, wherein:

the shell is formed as a single body with the resilient support portion to resiliently support the shell so that the shell is displaceable in the Z direction by contacting the housing.

16. A connector comprising:

a signal terminal including a terminal contact portion configured to make electrically conductive contact with a first contact portion of a connection target for connection from a Z direction one side;

a housing that retains the signal terminal; and a shell that surrounds at least part of the signal terminal, wherein in the connector:

the shell includes a shield contact portion configured to make electrically conductive contact with a second contact portion of the connection target; and the shell is displaceable in a Z direction, wherein:

the connector includes a ground terminal configured to make electrically conductive connection between an attachment target to which the connector is attached and the shell;

the shell and the ground terminal are separate;

the ground terminal includes a resilient support portion that resiliently supports the shell so that the shell is displaceable in the Z direction;

the resilient support portion includes a shell contact portion that electrically connects the ground terminal and the shell together by making electrically conductive contact with the shell;

the signal terminal includes a leading-end-side extension portion that extends in a specific direction as viewed from the Z direction and that includes the terminal contact portion at an extension direction leading end side;

the ground terminal includes a pair of leading-end-side extension portions that extend in the specific direction as viewed from the Z direction and that include the shell contact portion at an extension direction leading end side; and the pair of leading-end-side extension portions of the ground terminal are disposed at both Y direction sides with respect to the leading-end-side extension portion of the signal terminal.

17. A connector comprising:

a signal terminal including a terminal contact portion configured to make electrically conductive contact with a first contact portion of a connection target for connection from a Z direction one side;

a housing that retains the signal terminal; and a shell that surrounds at least part of the signal terminal, wherein in the connector:

the shell includes a shield contact portion configured to make electrically conductive contact with a second contact portion of the connection target; and the shell is displaceable in a Z direction, the connector further comprising a pair of movable assist plates having plate thickness directions facing in a Y direction and displacing in the Z direction together with displacement of the shell in the Z direction, wherein:

a portion of the signal terminal that projects out from the housing toward the Z direction one side is positioned between the pair of movable assist plates.

* * * * *